(12) United States Patent
Schwekendiek

(10) Patent No.: US 11,222,318 B1
(45) Date of Patent: Jan. 11, 2022

(54) CONTRACTOR POINT OF SALE SYSTEM

(71) Applicant: Groupon, Inc., Chicago, IL (US)

(72) Inventor: Ulf Schwekendiek, San Francisco, CA (US)

(73) Assignee: Groupon, Inc., Chicago, IL (US)

( * ) Notice: Subject to any disclaimer, the term of this patent is extended or adjusted under 35 U.S.C. 154(b) by 386 days.

(21) Appl. No.: 14/495,199

(22) Filed: Sep. 24, 2014

Related U.S. Application Data

(60) Provisional application No. 61/883,414, filed on Sep. 27, 2013.

(51) Int. Cl.
*G06Q 20/10* (2012.01)
*G06Q 20/20* (2012.01)

(52) U.S. Cl.
CPC .......... *G06Q 20/102* (2013.01); *G06Q 20/20* (2013.01)

(58) Field of Classification Search
CPC .... G06Q 10/06; G06Q 10/063; G06Q 10/087; G06Q 30/0637; G06Q 30/06; G06Q 30/0207; G06Q 30/0238; G06Q 10/10; G06Q 20/102; G06Q 20/20; G06Q 20/04; G06Q 20/387; G07F 17/3279; H04L 29/08108; G06F 17/40
USPC ................................................ 705/16; 16/16
See application file for complete search history.

(56) References Cited

U.S. PATENT DOCUMENTS

| | | | | |
|---|---|---|---|---|
| 5,970,479 | A * | 10/1999 | Shepherd | G06Q 40/02 705/37 |
| 6,076,079 | A * | 6/2000 | Boston et al. | 705/400 |
| 2004/0024700 | A1 * | 2/2004 | Petigny | 705/39 |
| 2004/0058731 | A1 * | 3/2004 | Rossides | G06Q 50/34 463/42 |
| 2006/0018450 | A1 * | 1/2006 | Sandberg-Diment | 379/93.12 |
| 2006/0036541 | A1 * | 2/2006 | Schleicher | 705/39 |
| 2007/0260541 | A1 * | 11/2007 | Trickel | G06Q 10/063 705/40 |
| 2010/0235283 | A1 * | 9/2010 | Gerson | 705/75 |
| 2012/0290422 | A1 * | 11/2012 | Bhinder | 705/21 |
| 2013/0080272 | A1 * | 3/2013 | Ronca et al. | 705/16 |

(Continued)

OTHER PUBLICATIONS

QuickBooks for Mac 2012, Shelly King, Oct. 27, 2011 (Year: 2011).*

*Primary Examiner* — Hao Fu
(74) *Attorney, Agent, or Firm* — Alston & Bird LLP

(57) ABSTRACT

Systems and related methods facilitating interactions between a merchant device, a central system and a consumer device are discussed herein. A system that may be implemented to provide a master merchant having a merchant device with a POS system configured to generate a bill for products, experiences, or services provided, a way to link or associate one or more accounts, such as contractor accounts to their master merchant account or merchant device, and transfer a portion of the payment to the linked accounts. In addition, some embodiments of the system may provide for receiving selection of, for each product, service or experience provided, a contractor account from a list of one or more approved contractor accounts linked to the master merchant account. Further embodiments may provide for receiving a payment or payment information for a charge amount, the charge amount comprised of costs associated with the products, services and experiences, as well as adjustments for redeemed instruments, taxes, tip or the like.

18 Claims, 13 Drawing Sheets

(56) References Cited

U.S. PATENT DOCUMENTS

2013/0275237 A1* 10/2013 Ramaratnam et al. ......... 705/16
2014/0058938 A1* 2/2014 McClung, III .................. 705/41

* cited by examiner

310

305

320

315

510

505

520

515

530

525 of the invention relate, generally, to providing a point-of-sale system that enables a master merchant account to comprise one or more linked merchant accounts.
CONTRACTOR POINT OF SALE SYSTEM

RELATED APPLICATIONS

This application claims priority to and the benefit of the filing date of U.S. Provisional Patent Application No. 61/883,414, titled "CONTRACTOR POINT OF SALE SYSTEM" filed on Sep. 27, 2013, which is hereby incorporated by reference in its entirety.

This application incorporates by reference each of the following in their entirety: U.S. Provisional Patent Application No. 61/715,229, entitled "Peer-to-Peer Payment Processing," filed Oct. 17, 2012 and U.S. patent application Ser. No. 13/764,753, entitled "Consumer Device Payment Token Management," filed Feb. 11, 2013.

FIELD

Embodiments of the invention relate, generally, to providing a point-of-sale system that enables a master merchant account to comprise one or more linked merchant accounts.

BACKGROUND

Conventional point of sale ("POS") systems are historically tied to a single entity or bank account, thereby allowing for a single routing of a payment from a consumer to a particular merchant account during each transaction. However, there may be a variety of reasons that a merchant may want to link a POS system to a number of disparate merchant or contractor accounts. In this regard, areas for improving current systems have been identified. Through applied effort, ingenuity, and innovation, solutions to improve such systems have been realized and are described in connection with embodiments of the present invention.

BRIEF SUMMARY

In general, embodiments of the present invention provided herein include systems, methods and computer readable media for providing a POS system that enables transaction processing by a master merchant account that enables funds to pass to and from one or more linked contractor accounts.

In some embodiments, a merchant device for enabling transaction processing by a master merchant account that enables funds to pass to and from one or more linked approved contractor accounts may be provided comprising a processor including one or more processing devices configured to perform independently or in tandem to execute hard-coded functions or execute software instructions, a user interface, a communications module, and a memory comprising one or more volatile or non-volatile electronic storage devices storing computer-readable instructions configured to enable transaction processing by a master merchant account thereby enabling funds to pass to and from one or more linked approved contractor accounts, the computer-readable instructions being configured, when executed, to cause the processor to generate a bill, the bill comprising at least a charge amount and at least one indication for each of (1) one or more products provided, (2) one or more experiences provided, and (3) one or more services provided, wherein each of the one or more products provided, one or more experiences provided and one or more services provided is associated with a cost, receive selection of, for one or more of the at least one indication of the one or more products provided, the one or more experiences provided, or the one or more services provided, an approved contractor account from a list of one or more approved contractor accounts linked to the master merchant account, receive a payment or payment information for the charge amount, and cause transfer of a portion of the charge amount to the approved contractor account.

In some embodiments, the memory may further store computer-readable instructions that, when executed, cause the processor to display, on the merchant device, via the user interface, at least one of the one or more contractor accounts as part of a list of one or more approved contractor accounts linked to the master merchant account, calculate a charge amount by adding at least the cost associated with each of the one or more products provided, the one or more experiences provided, and the one or more services provided, wherein the cost includes at least a first cost, the first cost associated with a portion of a cost of a first product, experience, or service that is associated with a first contractor account of the one or more contractor accounts and further comprises at least a second cost, the second costs associated with at least one of (1) a second portion of the cost of the first product, experience, or service, the second portion associated with a second contractor account of the one or more contractor accounts or (2) a portion of a second product, experience, or service that is associated with a second contractor account of the one or more contractor accounts, calculate the charge amount by subtracting an amount associated with one or more redeemed instruments, receive, via the user interface or the communications module, a tip amount, cause transfer, via the communication module, of at least a portion of the charge amount and a portion of the tip amount, to the first contractor account, the portion of the charge amount and the portion of the tip amount transferred to the first contractor account calculated by factoring the first cost, subtracting a commission amount, and subtracting an amount associated with a redeemed instrument, and cause transfer, via the communication module, of at least a portion of the charge amount and a portion of the tip amount, to the second contractor account, the portion of the charge amount and the portion of the tip amount transferred to the second contractor account calculated by (1) factoring the second cost, (2) subtracting a commission amount, and (3) subtracting an amount associated with a redeemed instrument.

In some embodiments the memory further stores computer-readable instructions that, when executed, cause the processor to receive, from user input, a request to add a new contractor account to a master merchant account, transmit, to a server, contractor authentication information associated with the new contractor account, display, on the merchant device, the new contractor account as part of a list of one or more approved contractor accounts linked to the master merchant account. In some embodiments the memory further stores computer-readable instructions that, when executed, cause the processor to calculate the charge amount by adding the cost associated with each of the one or more products provided, the one or more experiences provided, and the one or more services provided. In some embodiments, the memory further stores computer-readable instructions that, when executed, cause the processor to calculate the charge amount by subtracting an amount associated with one or more redeemed instruments.

In some embodiments, the memory further stores computer-readable instructions that, when executed, cause the processor to receive payment for the charge amount and a tip amount. In some embodiments, the memory further stores computer-readable instructions that, when executed, cause the processor to calculate the portion of the charge amount based on the cost associated the one or more products provided, the one or more experiences provided and the one or more services provided. In some embodiments, the memory further stores computer-readable instructions that, when executed, cause the processor to calculate the portion of the charge amount by subtracting a commission amount. In some embodiments, the memory further stores computer-readable instructions that, when executed, cause the processor to calculate the portion of the charge amount by subtracting an amount associated with a redeemed instrument.

In some embodiments, a central system may be provided comprising a networked device comprising communications circuitry configured to facilitate communications with a consumer device and a merchant device, and processing circuitry including one or more processing devices configured to perform independently or in tandem to execute hard-coded functions or execute software instructions; and a memory comprising one or more volatile or non-volatile electronic storage devices storing computer-readable instructions configured to enable transaction processing by a master merchant account thereby enabling funds to pass to and from one or more linked approved contractor accounts, the computer-readable instructions being configured, when executed, to cause the processing circuitry to receive a payment in response to a bill, the bill comprising at least a charge amount and at least one indication for each of (1) one or more products provided, (2) one or more experiences provided, and (3) one or more services provided, receive an indication of a selection of an approved contractor account from a list of one or more approved contractor accounts linked to the master merchant account for one or more of the at least one indications and an indication of an associated portion of the payment, and route a portion of the payment associated with product, service or experience indicated to the approved contractor account.

In some embodiments, the memory further stores computer-readable instructions that, when executed, cause the processing circuitry to reduce the associated portion of the payment routed to the approved contractor account by a commission amount. In some embodiments, the memory further stores computer-readable instructions that, when executed, cause the processing circuitry to reduce the associated portion of the payment routed to the approved contractor account by an amount associated with a redeemed instrument.

In some embodiments, a method enabling transaction processing by a master merchant account that enables funds to pass to and from one or more linked approved contractor accounts may be provided, the method comprising generating a bill, the bill comprising at least a charge amount and at least one indication for each of (1) one or more products provided, (2) one or more experiences provided, and (3) one or more services provided, wherein each of the one or more products provided, one or more experiences provided and one or more services provided is associated with a cost, receiving selection of, for one or more of the at least one indication of the one or more products provided, the one or more experiences provided, or the one or more services provided, an approved contractor account from a list of one or more approved contractor accounts linked to the master merchant account, receiving a payment or payment information for the charge amount, and causing transfer of a portion of the charge amount to the approved contractor account.

In some embodiments, the method may further comprise receiving, from user input, a request to add a new contractor account to a master merchant account, transmitting, to a server, contractor authentication information associated with the new contractor account, displaying, on the merchant device, the new contractor account as part of a list of one or more approved contractor accounts linked to the master merchant account. In some embodiments, the method may further comprise calculating the charge amount by adding the cost associated with each of the one or more products provided, the one or more experiences provided, and the one or more services provided. In some embodiments, the method may further comprise calculating the charge amount by subtracting an amount associated with one or more redeemed instruments. In some embodiments, the method may further comprise receiving payment for the charge amount and a tip amount. In some embodiments, the method may further comprise calculating the portion of the charge amount based on the cost associated the one or more products provided, the one or more experiences provided and the one or more services provided. In some embodiments, the method may further comprise calculating the portion of the charge amount by subtracting a commission amount. In some embodiments, the method may further comprise calculating the portion of the charge amount by subtracting an amount associated with a redeemed instrument.

In some embodiments, a method may be provided, the method configured to facilitate communications with a consumer device and a merchant device, comprising receiving a payment in response to a bill, the bill comprising at least a charge amount and at least one indication for each of (1) one or more products provided, (2) one or more experiences provided, and (3) one or more services provided, receiving an indication of a selection of an approved contractor account from a list of one or more approved contractor accounts linked to the master merchant account for one or more of the at least one indications and an indication of an associated portion of the payment, and routing a portion of the payment associated with product, service or experience indicated to the approved contractor account.

In some embodiments, the method may further comprise reducing the associated portion of the payment routed to the approved contractor account by a commission amount. In some embodiments, the method may further comprise reducing the associated portion of the payment routed to the approved contractor account by an amount associated with a redeemed instrument.

In some embodiments, a computer program product may be provided comprising at least one computer-readable storage medium having computer-executable program code instructions stored therein, the computer-executable program code instructions comprising program code instructions for generating a bill, the bill comprising at least a charge amount and at least one indication for each of (1) one or more products provided, (2) one or more experiences provided, and (3) one or more services provided, wherein each of the one or more products provided, one or more experiences provided and one or more services provided is associated with a cost, receiving selection of, for one or more of the at least one indication of the one or more products provided, the one or more experiences provided, or the one or more services provided, an approved contractor account from a list of one or more approved contractor accounts linked to the master merchant account, receiving a payment or payment information for the charge amount, and causing transfer of a portion of the charge amount to the approved contractor account.

In some embodiments, the computer-executable program code instructions further comprise program code instructions for receiving, from user input, a request to add a new contractor account to a master merchant account, transmitting, to a server, contractor authentication information associated with the new contractor account, displaying, on the merchant device, the new contractor account as part of a list of one or more approved contractor accounts linked to the master merchant account. In some embodiments, the computer-executable program code instructions further comprise program code instructions for calculating the charge amount by adding the cost associated with each of the one or more products provided, the one or more experiences provided, and the one or more services provided.

In some embodiments, the computer-executable program code instructions further comprise program code instructions for calculating the charge amount by subtracting an amount associated with one or more redeemed instruments. In some embodiments, the computer-executable program code instructions further comprise program code instructions for receiving payment for the charge amount and a tip amount. In some embodiments, the computer-executable program code instructions further comprise program code instructions for calculating the portion of the charge amount based on the cost associated the one or more products provided, the one or more experiences provided and the one or more services provided.

In some embodiments, the computer-executable program code instructions further comprise program code instructions for calculating the portion of the charge amount by subtracting a commission amount. In some embodiments, the computer-executable program code instructions further comprise program code instructions for calculating the portion of the charge amount by subtracting an amount associated with a redeemed instrument.

In some embodiments, a computer program product may be provided comprising at least one computer-readable storage medium having computer-executable program code instructions stored therein, the computer-executable program code instructions comprising program code instructions for, comprising a networked device comprising communications circuitry configured to facilitate communications with a consumer device and a merchant device, and processing circuitry configured to receive a payment in response to a bill, the bill comprising at least a charge amount and at least one indication for each of (1) one or more products provided, (2) one or more experiences provided, and (3) one or more services provided, receive an indication of a selection of an approved contractor account from a list of one or more approved contractor accounts linked to the master merchant account for one or more of the at least one indications and an indication of an associated portion of the payment, and route a portion of the payment associated with product, service or experience indicated to the approved contractor account.

In some embodiments, the processing circuitry is further configured to reduce the associated portion of the payment routed to the approved contractor account by a commission amount. In some embodiments, the processing circuitry is further configured to reduce the associated portion of the payment routed to the approved contractor account by an amount associated with a redeemed instrument.

BRIEF DESCRIPTION OF THE DRAWINGS

Figure 1:
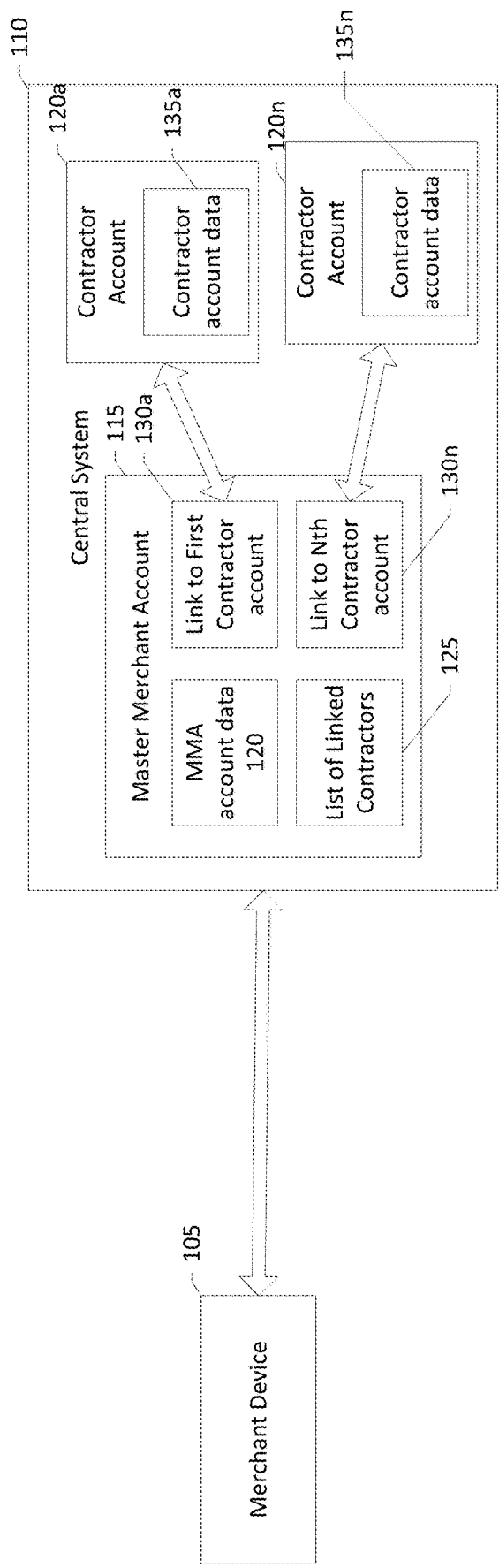
Figure 2A:
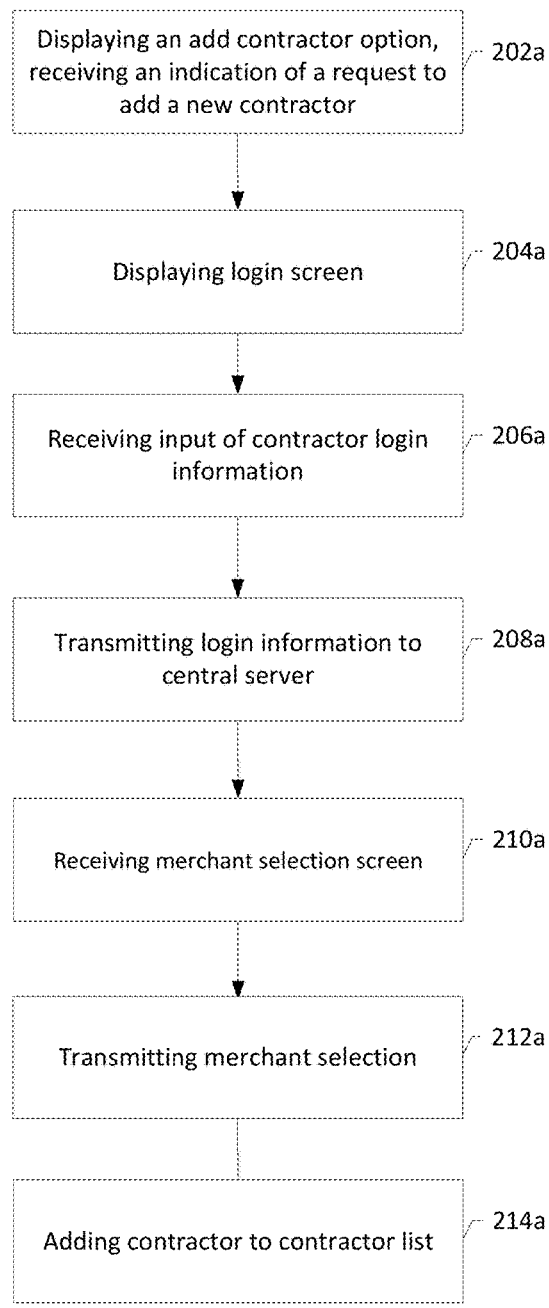
Figure 2B:
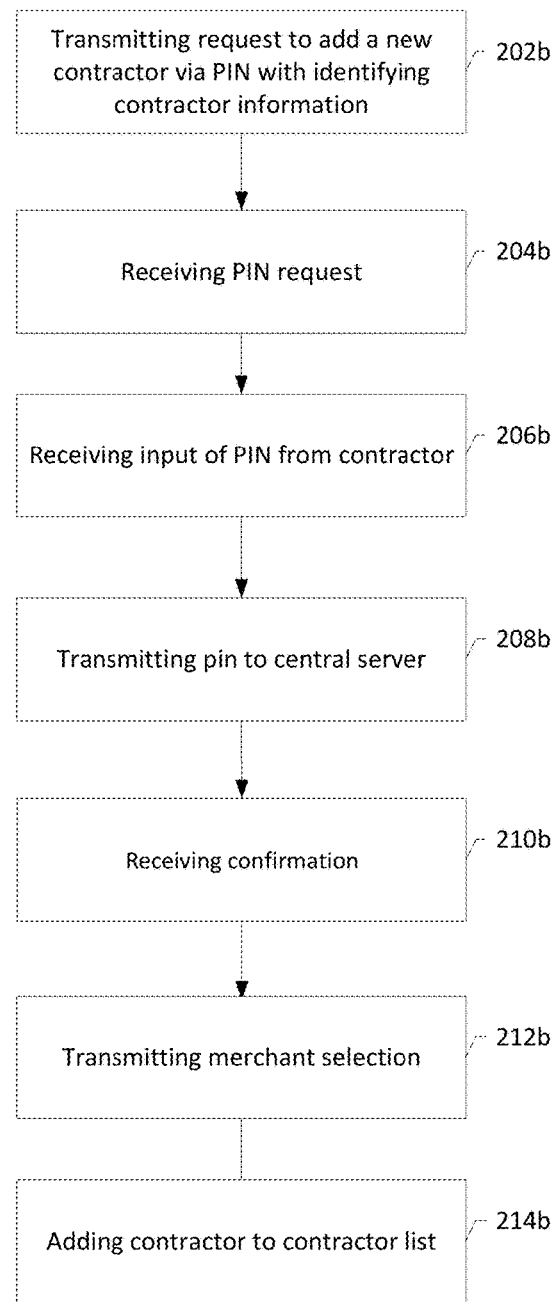
Figure 4:
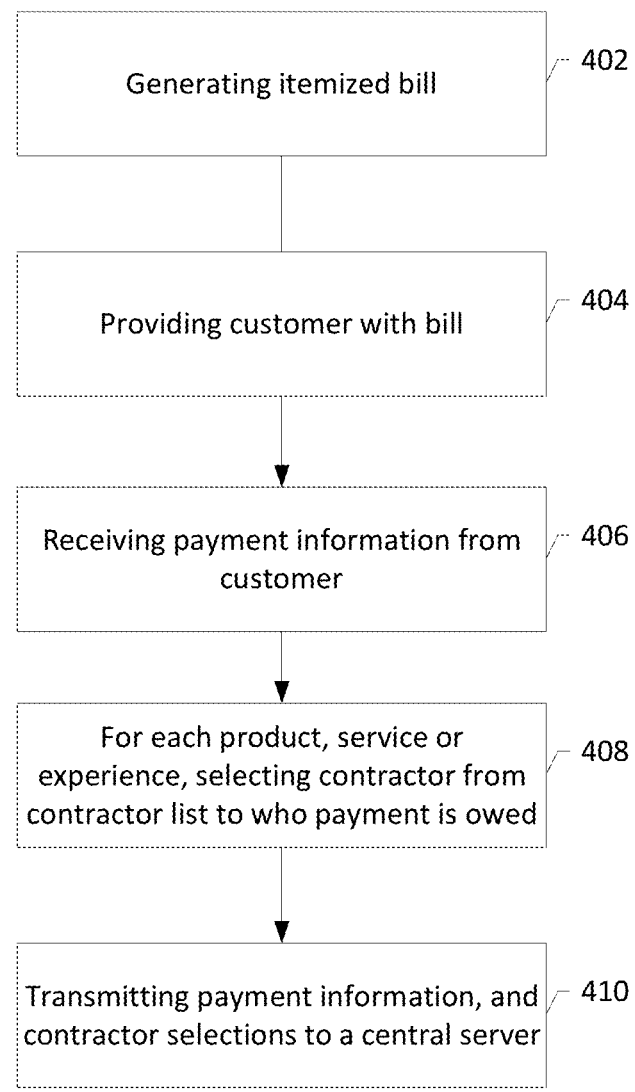
Figure 6:
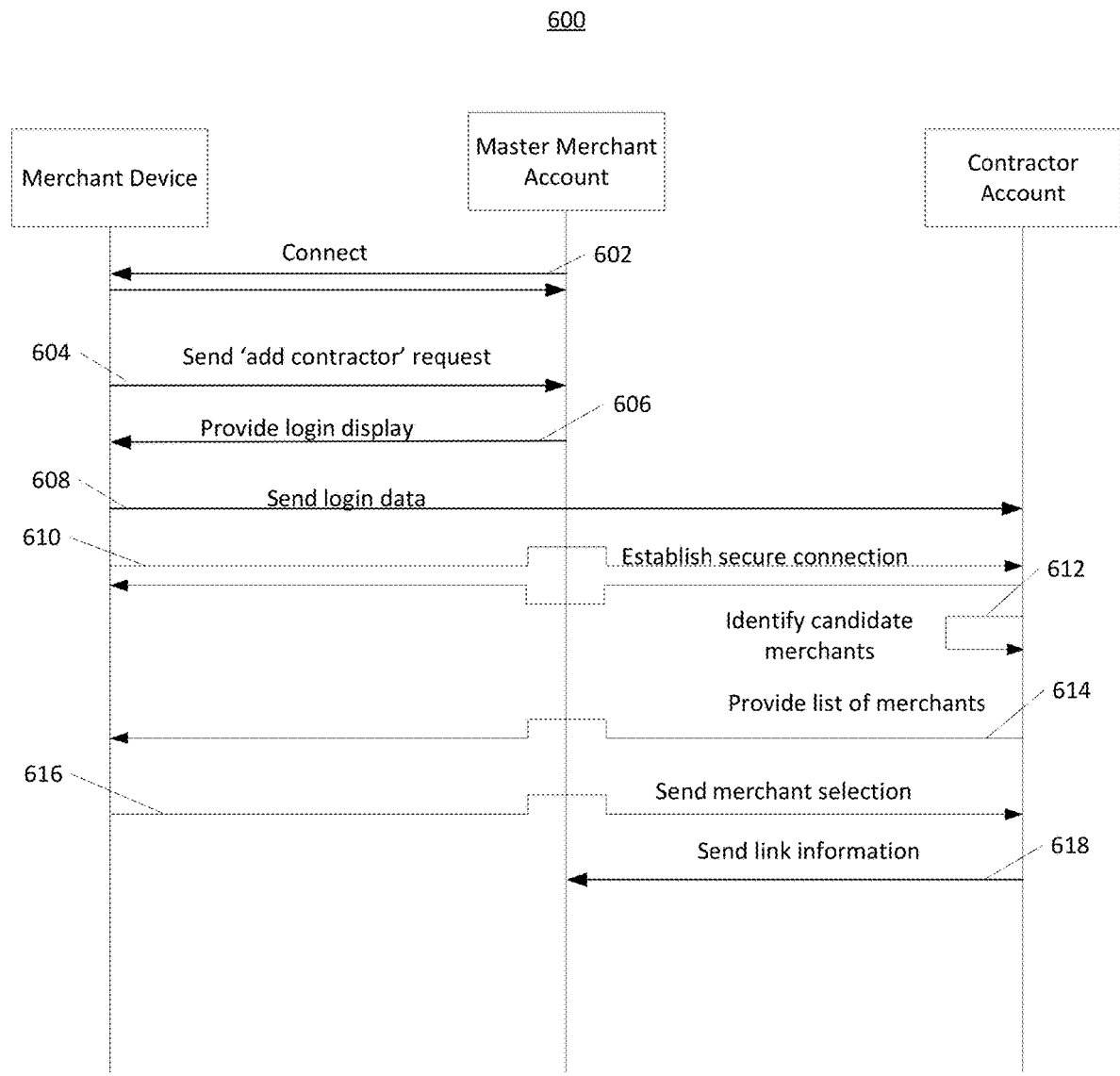
Figure 7A:
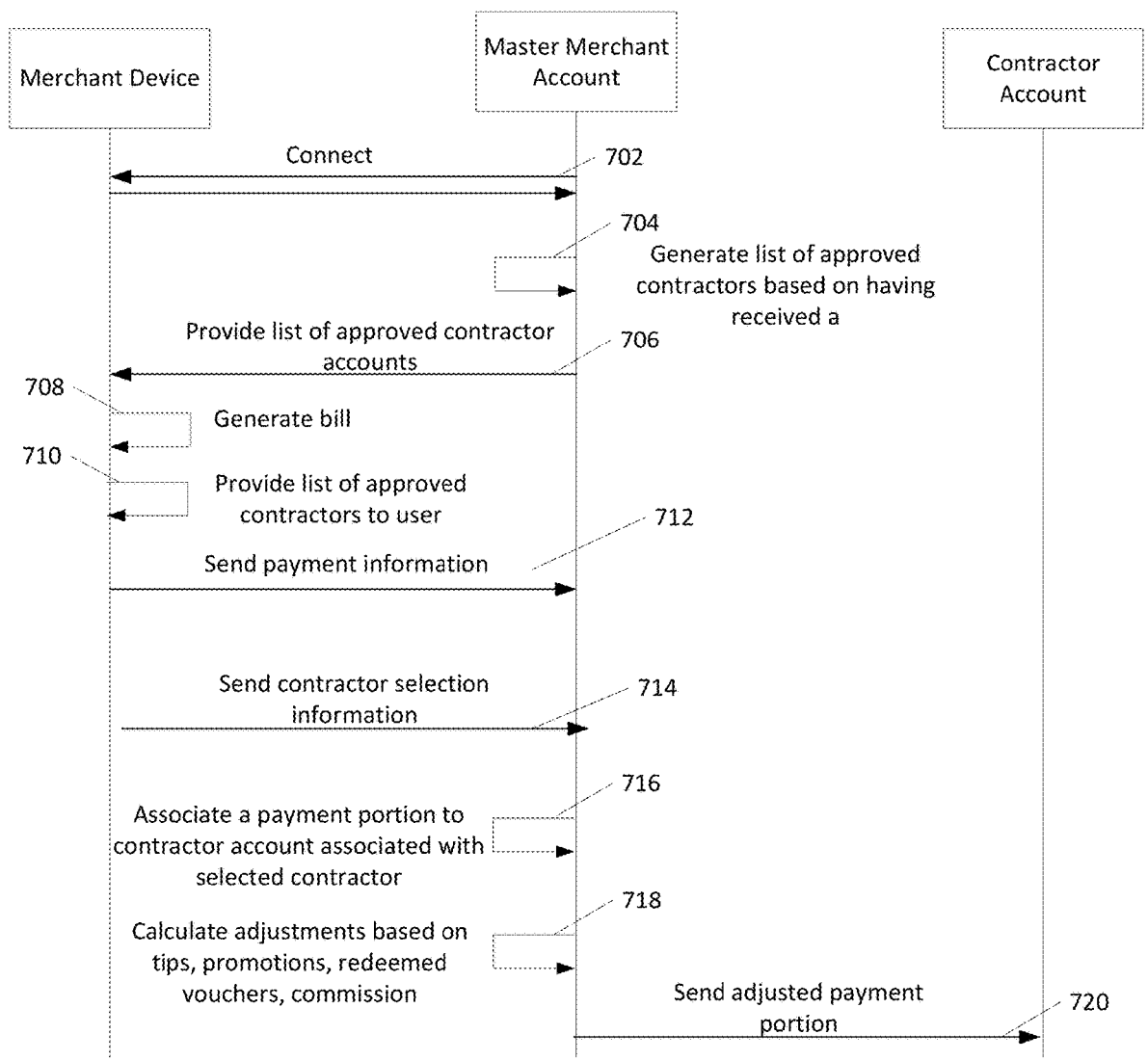
Figure 7B:
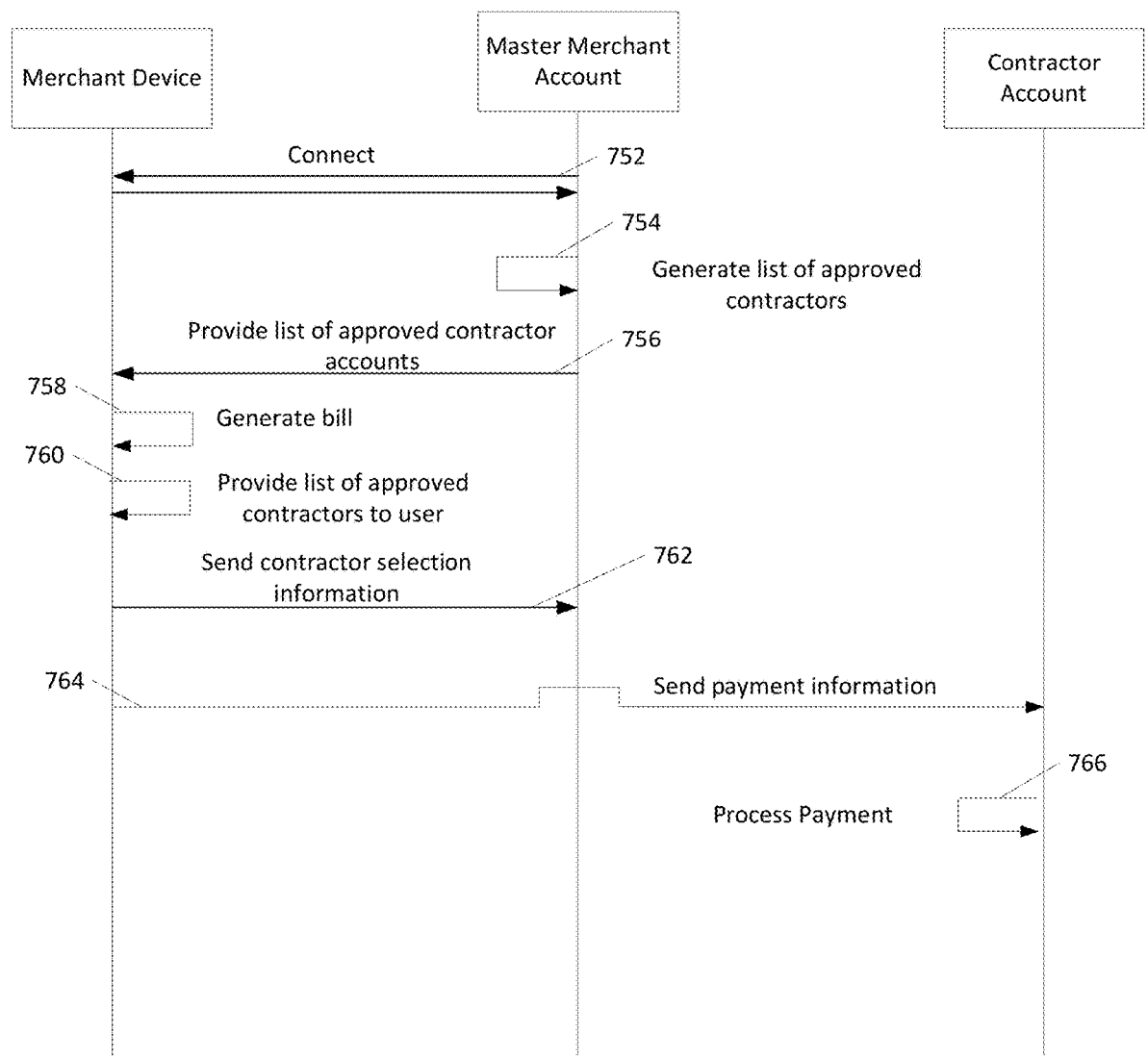
Figure 8:
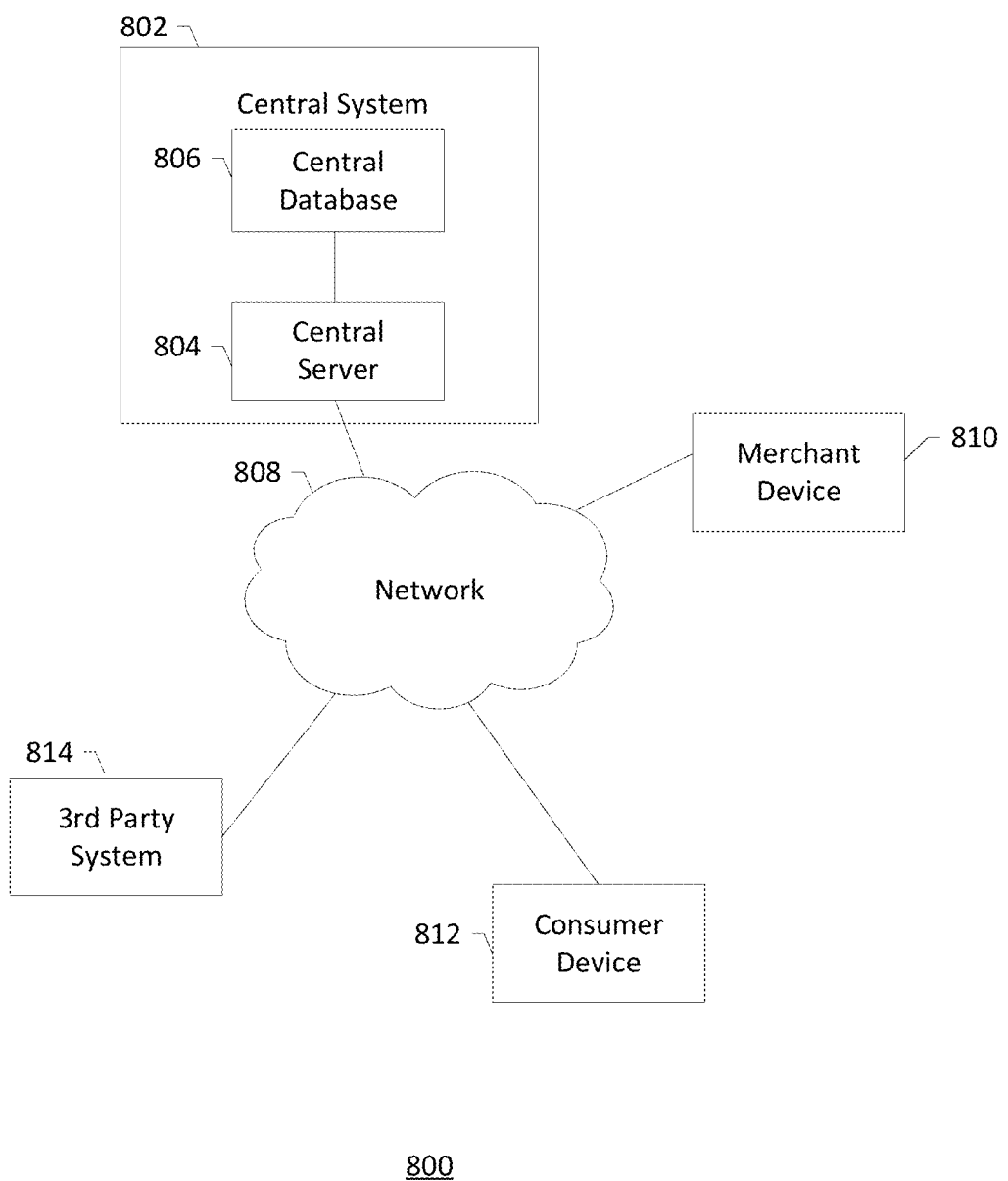
Figure 9:
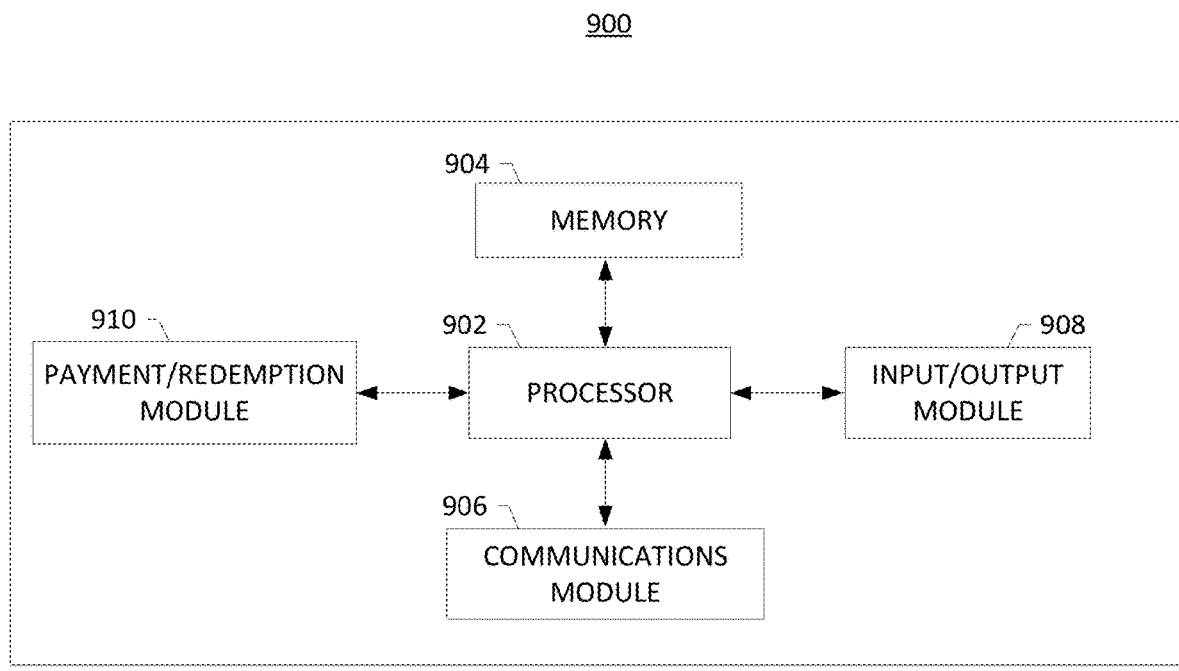

Having thus described some embodiments in general terms, reference will now be made to the accompanying drawings, which are not necessarily drawn to scale, and wherein:

FIG. 1 shows an example schematic block diagram of circuitry, configured in accordance with some embodiments;

FIG. 2a shows a flow chart of an example method, performed in accordance with some embodiments;

FIG. 2b shows a flow chart of an example method, performed in accordance with some embodiments;

FIGS. 3a-3d show example graphical user interface displays that may be presented by various components of systems, in accordance with some embodiments;

FIG. 4 a flow chart of an example method, performed in accordance with some embodiments;

FIGS. 5a-5f show example graphical user interface displays that may be presented by various components of systems, in accordance with some embodiments;

FIG. 6 shows a flow chart of an example data flow, performed in accordance with some embodiments;

FIGS. 7a and 7b show a flow chart of an example data flow, performed in accordance with some embodiments;

FIG. 8 shows an example system for facilitating interactions between consumers, contractors, and the merchant, configured in accordance with some embodiments; and FIG. 9 shows an example schematic block diagram of circuitry, configured in accordance with some embodiments.

DETAILED DESCRIPTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

Glossary

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

The term "central system" as used herein refers to any marketing system, payment processing system, coupon provider system, and/or any other type of promotional system controlled by a merchant, third party and/or any other type of user (e.g., such as hardware provider, software application developer, online retailer, brick-and-mortar retailer, etc.). The central system may be accessible via one or more computing devices and may be operable to provide example promotion and/or marketing services on behalf of one or more providers that are offering one or more instruments that are redeemable for goods, services, experiences and/or the like. The central system may be further configured to illustrate or otherwise inform one or more consumers of the availability of one or more instruments in the form of one or more impressions. In some examples, the central system may also take the form of a redemption authority or payment processor, it may provide rewards indications and/or it may function as an entity within a financial network. As such, the central system is, in some example embodiments, configured to present one or more offers, accept payments for offers from both merchants and consumers, upon acceptance of an offer, issue instruments, indicate whether a instrument is valid for the purpose of redemption, generate rewards, provide a point of sale device or otherwise participate in the exchange of goods, services or experiences for currency and/or the like. In some embodiments discussed herein, the central system is referred to as a networked device.

A "promotion and marketing service" may provide promotion and/or marketing services on behalf of one or more providers (e.g., one or more merchants, retailers, etc.) that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

A "promotion" may be a deal purchased by a consumer from a promotional system, and may be considered an agreement for a particular provider to provide a service or good (e.g., a discounted service or good) to the consumer. A promotion may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion may be a deal offer whereby a running shoes company or intermediary (e.g., promotion provider) offers $50 of value toward the purchase of running shoes in exchange for $25. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, and using the running shoes company promotion as an example, the accepted value is $25 and the promotional value is $50. In this example, the residual value may be equal to the accepted value.

An "instrument" associated with a promotion may include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as an accepted value, a promotional value and/or a residual value. For example, using the aforementioned running shoes company as the example provider, an electronic indication in a mobile application that shows $50 of value to spend at the running shoes company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

A "provider" may be considered a merchant, retailer, or other provider of goods or services that offers a promotion, as agreed upon with the promotion and marketing service affiliated with the promotional system. A provider may include, but is not limited to, a merchant, business owner, consigner, shopkeeper, tradesperson, vender, operator, entrepreneur, agent, dealer, retailer, organization or the like that is in the business of a providing a good, service or experience to a consumer, facilitating the provision of a good, service or experience to a consumer and/or otherwise operating in the stream of commerce. For example, a provider may the form of a running shoes company that sells attire that is generally used by a person who runs or participates in athletic activities.

An "impression" may be considered a communication advertising an offer to purchase a promotion from a promotional system. An impression may include a communication, a display, or other perceived indication, such as a flyer, print media, e-mail, text message, application alert, mobile applications, other type of electronic interface or distribution channel and/or the like, of one or more promotions. For example, and using the aforementioned running company as the example provider, an e-mail communication sent to consumers that indicates the availability of a $25 for $50 toward running shoes promotion.

Impressions are therefore provided to "consumers," including, but not limited to, a client, customer, purchaser, shopper, user of the promotional system or the like who may be in the position to or does exchange value for one or more instruments under the terms defined by the one or promotions. For example, and using the aforementioned running shoes company as the example provider, an individual who is interested in purchasing running shoes.

Analyzing "explicit data," such as user-provided data in user profiles, preferences, and/or promotion purchase history, for example, may allow the promotional system to better target promotion types or impressions to consumers. A consumer may be more likely to purchase a promotion if the impression advertising the promotion is of interest to the consumer than if the associated promotion was selected at random.

Additionally or alternatively, accessing "implicit data," data that may be user-provided for a purpose other than for use on the promotional system and/or detected by the promotional system, may allow a promotional system to gather information on consumer behaviors, preferences and preferred locations. Example implicit data may include data indicative of a consumer's browsing history, detected location, or the consumer's social network profile information, for example.

More specifically, embodiments provided herein may include a system that may be implemented to provide a "master merchant" (e.g., those that have "brick-and-mortar" retail space and/or an online or web presence), a way to link or associate one or more accounts, such as "contractor accounts" to a "master merchant account." The "master merchant" may be a provider of products, services, and/or experiences at, for example, a brick-and-mortar or online retail space. The "master merchant" may have employees who may operate a "merchant device" with a POS system configured to send payment to a "master merchant account" and "contractors" who provide services and/or experiences to consumers. An employee is someone who works for a master merchant whereas a "contractor" may be a person who contracts to perform services and/or provide experiences on behalf of the "master merchant." In some embodiments, a contractor may be an independent contractor, a consignor, or the like. A "contractor" may be paid for the individual services performed and/or experiences provided. In addition, some embodiments of the system may provide for providing the merchant device, a contractor or a contractor account indication as part of a list of one or more approved contractor accounts linked to the master merchant account. Further embodiments may provide for selecting and/or assigning, for each of one or more provided products, services, or experiences, a contractor account from a list of one or more approved contractor accounts linked to the master merchant account. The selection or assignment of the contractor may then allow a portion of a payment to be sent to the contractor account. Further embodiments may provide for generating a "bill", the bill may comprise at least a "charge amount" (e.g., a total payment owed) and at least one indication of each of (1) one or more products provided, (2) one or more experiences provided; and (3) one or more services provided. The charge amount may be a total payment owed and may be calculated by adding the cost associated with each of the one or more products provided, the one or more experiences provided, and the one or more services provided; adding a tip amount; subtracting an amount associated with one or more redeemed instruments.

A "merchant device" may refer to a device that belongs to the master merchant used by the employee or a device that personally belongs to the employee. A merchant device may refer to a mobile device or a stationary device. Example mobile devices may include a cellular telephone (including smartphones and/or other types of mobile telephones), laptop, wireless POS device, tablet, wireless computing device, or the like. Example stationary devices may include a desktop computer, work station, wired POS device, server, or the like.

The "master merchant account" or the "contractor account" may be a financial account, such as a checking account, debit account, direct deposit account, third party payment account, savings account, bank account, internet payment account, or the like. Accordingly, the "master merchant account" and the "contractor account" may be configured for receiving a payment that increases the balance, and/or providing a payment (e.g., "refund") that decreases the balance.

Some embodiments described herein may include one or more methods for performing the functionality described herein and/or non-transitory computer readable media storing instructions for performing the one or more methods that are executable by a processor. Other embodiments may include machines, such as an apparatus and/or system, configured to implement the methods and/or other functionality discussed herein. For example, the machine may include one or more processors and/or other machine components configured to implement the functionality discussed herein based on instructions and/or other data stored in memory, circuitry, and/or non-transitory computer readable media.

These characteristics as well as additional features, functions, and details of various corresponding and additional embodiments are described below.

Overview

The methods, apparatus and computer program products described herein are operable for the providing of a point-of-sale system that enables a master merchant account to comprise linked contractor accounts, thus allowing a merchant device associated with a master merchant account to conduct transactions on behalf of a contractor associated with at least one of the linked contractor accounts. As such, payments or portions of payments paid for products, services or experiences provided by a contractor may be made to the linked contractor account.

In some embodiments, a master merchant account may link a POS system to a number of disparate merchant or contractor accounts. For example, a maser merchant account may provide for transferring payment to different accounts based on a product, service or experience provided (e.g., food and beverage to account A and professional services in account B). In some embodiments, a merchant (or "master merchant") may hire one or more contractors to provide services (e.g., hairstylists, beauticians, etc.) or may sell products, services, or experiences on behalf of one or more other merchants (e.g., consignments, etc.) and, thus, may want to have the payments received transferred directly to the contractor or other merchant. In some embodiments, the master merchant may take a commission, seat fee or the like out of each transaction. In some embodiments, payments may be adjusted based on taxes, tips, purchase of promotions, redemption of instruments, or the like.

An advantage that may be realized by some embodiments discussed herein allows for payments for one or more products, services, and/or experiences to be accepted from a consumer, the payments for each individual product, services or experience then being made to or processed by a contractor account directly. Another advantage that may be realized herein allows for a system where payments for products, services, or experiences provided by one or more employees or contractors may be accepted at a merchant device without each of the or more employees or contractors having to login every time. Another advantage that may be realized by some embodiments discussed herein is that the merchant device can be configured to facilitate a network-based payment to a contractor account. As such, to a consumer making a payment for one or more products, services, or experiences, the system provides for a single transaction. The one or more transactions required to complete the transaction may be handled away from the consumer.

Other advantages that may be realized by some embodiments discussed herein include allowing a master merchant to facilitate payments to one or more contractors, allowing commissions to be kept, tips to be paid, taxes withheld, etc., providing promotional offerings (e.g., impressions, vouchers, sales, discounts, rewards, or the like) to the consumer, and/or facilitating consumer service and point-of-sale functionality.

Example System Architecture

FIG. 1 is a block diagram showing an exemplary system 100 for providing of a point-of-sale system that enables a master merchant account to comprise linked contractor accounts, allowing payments for products, services or experiences to be made directly to a contractor account on a merchant device. The system 100 may be configured to include a merchant device 105, a central system 110 including a master merchant account 115 and contractor accounts 120a and 120n. The merchant device 110, as described above may be a personal computer, tablet, mobile device or the like. The master merchant account may be configured to include master merchant account data 120, a list of linked contractors 125, and one links to each of a first contractor account and a Nth contractor account 130a-130n. The contractor accounts 120a-120n may be configured to include contractor account data 135a-135n. Master merchant account data and contractor account data may include identifying data, financial data, transaction data, and/or the like.

In some configurations, the merchant device 105 may operate a POS application and conduct transactions on behalf of the master merchant account. In some configurations, the central system 110 may be configured to send the merchant device 105 master merchant account data. The merchant device may be configured to generate itemized bills and receive payment information from consumers. In some configurations, payment information may be received from a credit card swiper hardwired or wirelessly connected to the merchant device. In some configurations, a virtual wallet may be employed by a consumer for providing payment information. In some embodiments, a consumer may pay with cash and the merchant device 105 may be configured to receive input indicating such.

In some configurations, the central system 110 may be configured to send the merchant device 105 a list of linked contractors. The merchant device 105 may then be configured to display the list of linked contractors to a user of the merchant device for selection during a payment allocation process. In some configurations, the payment is sent to the master merchant account 115 where, based on adjustments related to commissions, taxes, etc. an adjusted payment portion may be sent to a contractor account. In some configurations, the central server 115 may be configured to provide the merchant device 105 with data allowing payment portions to be sent directly to the contractor accounts.

Set-Up Process Overview

In some embodiments, in order to allow the master merchant or employee operating a merchant device having the master merchant account to conduct a transaction on behalf of the contractor, the contractor account may first be linked to the master merchant account. In other words, a contractor must first provide authorization, for example, via a contractor account, allowing for the master merchant account to link to the contractor account and conduct transactions on behalf of the contractor. Accordingly, before a merchant device or a master merchant account comprising links to one or more contractor accounts may be provided, an authorization and authentication process may, first, be performed. In other words, the merchant device and/or the master merchant account may first perform an authorization process to add a contractor account to a list of available contractor accounts. In some examples, an employee utilizing a merchant device may initiate a process for adding a contractor account, but before the contractor account is linked, contractor login information or, in some embodiments, a pin may be entered by the contractor. FIGS. 2a and 2b show flow charts of an example methods for providing authorization for linking a contractor account to the master merchant account, in accordance with some embodiments.

Method 200 will be described with reference to example displays 305-320 shown in FIGS. 3a-3d, respectively. FIGS. 3a-3d show example displays 305, 310, 315, and 320 that may be presented by one or more display screens of one or more machines, such as those used by master merchants or their employees, which as described above, are referred to herein as "merchant devices." While the example displays 305, 310, 315, and 320 are configured to be shown on a tablet computer (or other device having similar dimensions), similar interfaces may be utilized with other types of merchant devices discussed herein and modified accordingly (e.g., for screen size, input device compatibly, ease of use, etc.).

In some embodiments, any physical device may be configured to perform the functionalities described herein with respect to both merchant devices and consumer devices. For example, a device may be configured to make a payment (e.g., like a consumer device) and also receive a payment (e.g., like a merchant device), among other things described herein.

In some embodiments, the techniques described herein may be implemented via one or more applications that execute locally and causes a merchant/consumer device to be configured to function as a specialized machine. Additionally or alternatively, cloud-based, multi-tenant, thin-client, and/or other types of networked service techniques may be used. For example, one or more functionalities described herein as being performed by a merchant device or consumer device may execute on a remote device, such as a server and/or other networked machine. User input information may be generated by and sent from the merchant/consumer device to the remote device, while visual and/or audio information is sent from the remote device to the merchant/consumer device.

Figure 3B:
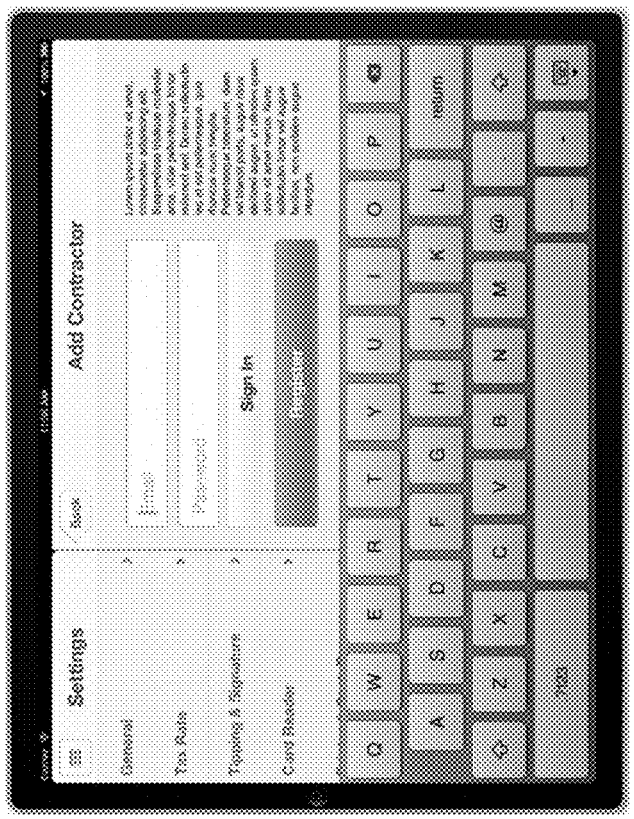
Figure 3A:
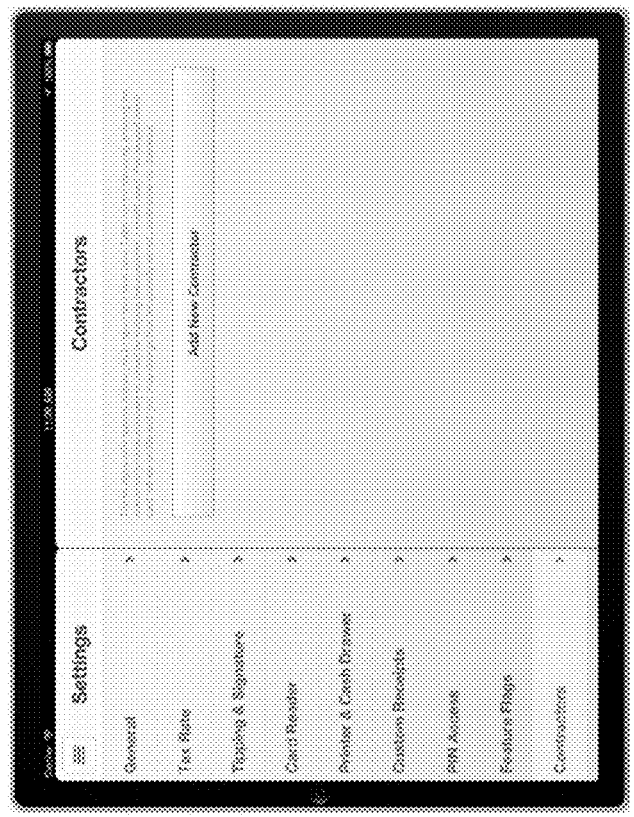

Turning back to FIG. 2, as shown in block 202a of FIG. 2a, an apparatus, such as merchant device 105, may be configured for displaying and/or providing an option to add a contractor, contractor account, or the like and receiving an indication of a request to add a new contractor, contractor account or the like. For example, display 305 of FIG. 3a shows a display screen that may be displayed by a merchant device. Display 305, like some or all of the other displays discussed herein, may be accessed by virtually any method, such as an application executing locally. Alternatively and/or additionally, login display 300 may be accessed from one or more servers (e.g., central server 804 shown in FIG. 8) via a web browser, such as by entering an address (e.g., a uniform resource locator ("URL") address) into the web browser's location bar. Display 305 may be configured to allow for, for example, an employee to initiate a process for adding a contractor to the master merchant account. Display 305 may be configured to receive an input indication of a request to add a new contractor. In some embodiments, display 305 may provide for an option allowing a contractor to login directly, by for example, providing the merchant device with a username and password. This option may be best suited when the contractor is available to access the merchant device.

After receiving an indication of a request to add a new contractor, contractor account or the like, as shown in block 202a of FIG. 2a, an apparatus, such as merchant device 105, may be configured for displaying and/or providing a login screen. As such, as shown in FIG. 3b, a login display 310 may be configured to provide a place to input a username (e.g., email address) and password. Display 310 may also be configured to provide a sign in selection and/or a register selection. As shown in block 206a of FIG. 2, an apparatus, such as merchant device 105, may be configured for receiving login data. Login data may include a username and password, a personal identification number or the like.

In some embodiments, a user of the merchant device may have an account already and wish to login, and in some embodiments, a user of the merchant device may wish to register an account. As such, the apparatus may be further configured to receive an input of a login request or a register request.

Once the input is received, the apparatus may transmit the login information (e.g., username and password) to a central server for authentication. Accordingly, as shown in block 208a of FIG. 2a, an apparatus, such as merchant device 105, may be configured for transmitting the login information to the central server. As one of ordinary skill in the art would appreciate, an authentication process may be performed, the process of which is outside the scope of the present application. Once the authentication process is performed, as shown in block 210a of FIG. 2, an apparatus, such as merchant device 105, may be configured for receiving confirmation. In some embodiments, if the login data is determined to be invalid, confirmation is not received and the method may return to 202a allowing for the contractor to make another attempt at providing login data. In some embodiments, the contractor account may be locked out after a certain number of unsuccessful login attempts.

Figure 3D:
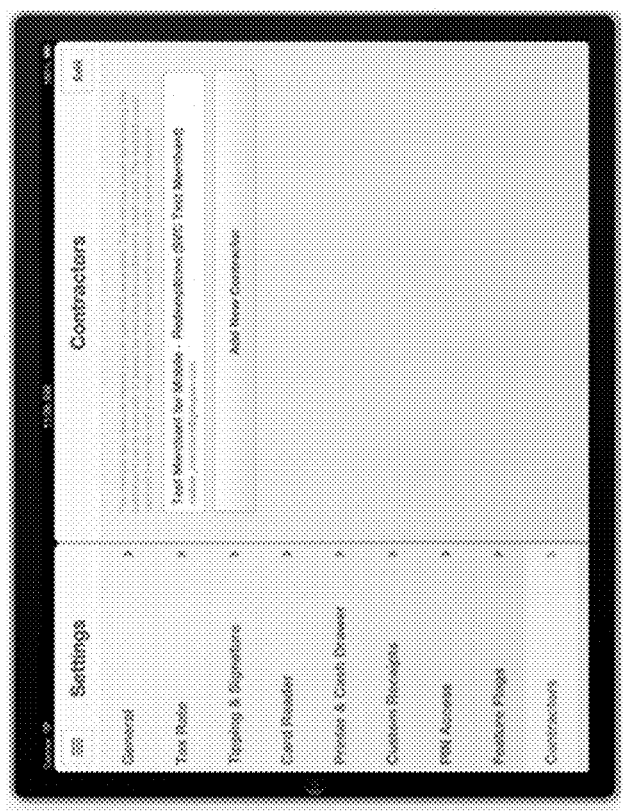
Figure 3C:
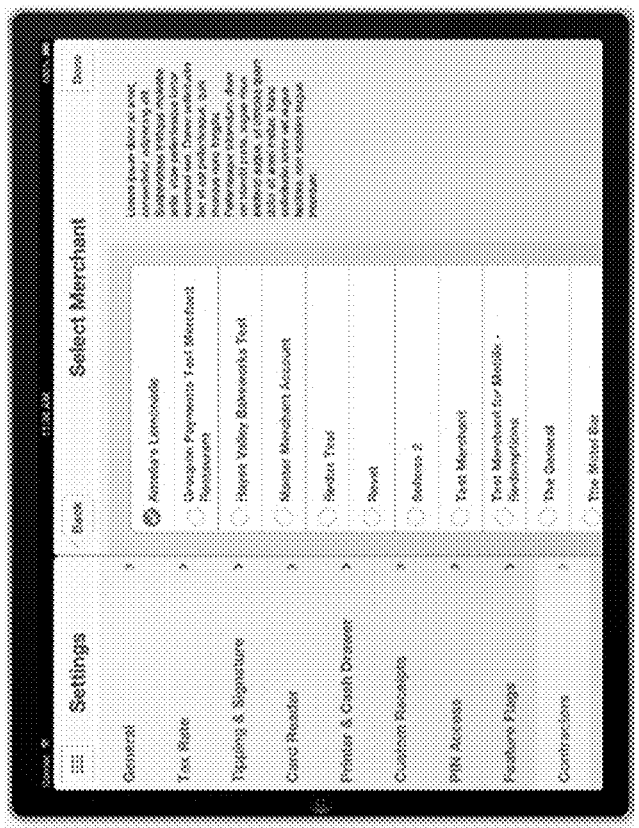

When the login data is confirmed to be correct, as shown in FIG. 3c, display 315 may be configured to display a contractor account screen. As shown in FIG. 3c, display 315 shows a list of merchants available for selection. In some embodiments, an identifier of the merchant device or a particular master merchant account may be transmitted concurrently with, before or after, the login information and as such, the master merchant associated with the merchant device and/or merchant device may be pre-selected, at the top of the displayed list, or the like. In some embodiments, no list is provided and a confirmation request is provided asking the contractor if a displayed merchant is the master merchant that the contractor wants to link to.

In some embodiments, the contractor account screen may provide links to one or more other screens of the contractor account. For example, the apparatus, such as merchant device 105, a display screen, or the like, may be configured for particular levels of security for any addition or subtraction of a contractor to a master merchant account; any sales transaction and/or any return or refund transaction. In some embodiments, the contractors may use a personal identification number (PIN) to validate each transaction, whereas in other examples other methods of validation may be used. For example, contractors may validate commissions at the end of each day, may remotely approve settings, contractors may define auto-approval parameters and/or the like. In some examples, the central system may be configured to provide interfaces for creating, updating, or otherwise modifying the types of actions that various master merchants or master merchant accounts may be allowed to perform on the contractors behalf. For example, the contractor may specify that the master merchant is allowed to provide payments, deduct master merchant portions of payments, etc. without approval but require approval for refunds.

Accordingly, as shown in block 212a of FIG. 2, an apparatus, such as merchant device 105, may be configured for receiving user input indicating a master merchant selection and/or transmitting a master merchant selection. The central server may then provide the master merchant account with authorization and/or information allowing the linking of the contractor account to the master merchant account. As such, as shown in block 214a of FIG. 2a, an apparatus, such as merchant device 105, may be configured for adding the contractor associated with the contractor account to the contractor list. Accordingly, as shown in FIG. 3d, display 320 may be configured to display a contractor list comprising each approved contractor, including for example, the newly linked contractor.

FIG. 2b shows an alternative authorization process. For example, in some embodiments, such as, for example, when a contractor is not able to access the merchant device and as such, cannot enter a password, or when, for example, a contractor has pre-established or identified the master merchant, display 305 may be configured to provide an option for entering a pin. As such, as shown in block 202b of FIG. 2b, an apparatus, such as merchant device 105, may be configured for transmitting a request to add a new contractor or contractor account via a personal identification number (PIN) method along with identifying contractor and/or contractor account information. For example, merchant device 104 may allow for a PIN option to be selected and for the input of a contractor username or the like. Central server or the like may then, upon receiving the request, provide a PIN, such as for example a one-time-use PIN, to a contractor mobile device or the like. The contract then may share the PIN with the employee operating the merchant device. As such, as shown in block 204b of FIG. 2b, an apparatus, such as merchant device 105, may be configured for requesting the PIN. As shown in block 206b of FIG. 2b, an apparatus, such as merchant device 105, may be configured for receiving input of the PIN and as shown in 208b, transmitting the PIN to the central server. Steps 210b-214b track with 210a-214a. In some embodiments, other methods may be provided for identifying a contractor, such as providing a biometric identifier (e.g., a fingerprint, voice message, retina scan, etc.) or the like.

Payment Allocation Process

In some embodiments, once the master merchant or employee operating a merchant device having the master merchant account is allowed to conduct a transaction on the contractor's behalf, payments may be allocated, sent to, and/or processed by a contractor account. In some embodiments, however, customers may buy multiple products, may be provided with multiple services or experiences or purchase a combination of products, services, and/or experiences. In those instances, portions of a payments related to one or more products, services or experiences provided by a particular contractor may be attributed to that particular contractor, and, in some embodiments, processed by the contractor account.

More specifically, in some embodiments, once a contractor has been added to a list of contractors for display on merchant device, the master merchant, or employee thereof, may select the contractor from the list, from a dropdown menu or the like. The master merchant may then attach or attribute one or more goods, services, or experiences to that contractor. The selection process may be repeated for each of one or more products, services, or experiences. Once the selection and attribution is complete, the master merchant may then take a payment from a customer. In some embodiments, at least a portion of the payment may be routed to the contractor. In some embodiments, a master merchant may apportion itself part of a product, service, or experience and/or a commission on each transaction.

In some embodiments, the master merchant may add products, services or experiences from multiple contractors or, in some embodiments, from the master merchant. In such an embodiment, each of the products, services or experiences may be attributed to the particular contractor or the master merchant. Once the payment is taken from the customer, the payment may then be advantageously allocated or otherwise routed to the correct contractors. For example, Contractor A may provide a haircut for $35, while the master merchant may offer a $3 latte. On checkout, the consumer is provided with a single bill, with a single charge, and provides a single payment (e.g., single credit card swipe or the like). Upon providing payment, the haircut may then be allocated to the contractor and the latte to the master merchant.

FIG. 4 shows a flow chart of an example method for allocating portions of a payment to different accounts, in accordance with some embodiments. And FIG. 5 shows a flow chart of an example method for selecting a particular master merchant to which to allocate a portion of a payment to, in accordance with some embodiments. As such, the master merchant may accept payments, and in some examples may offer returns, on behalf of the contractor while presenting to an end customer a seamless customer service experience. Once accepted, portions of the payment may then be allocated on a product, service or experience basis to a contractor who provided the product, service or experience.

Method 400 will be described with reference to example displays 505-530 shown in FIGS. 5a-5f, respectively. FIGS. 5a-5f show example displays 505-530 that may be presented by one or more display screens of one or more machines, such as those used by master merchants or their employees, which are referred to herein as "merchant devices." While the example displays 505-530 are configured to be shown on a tablet computer (or other device having similar dimensions), similar interfaces may be utilized with other types of merchant devices discussed herein and modified accordingly (e.g., for screen size, input device compatibly, ease of use, etc.).

Figure 5B:
Figure 5A:
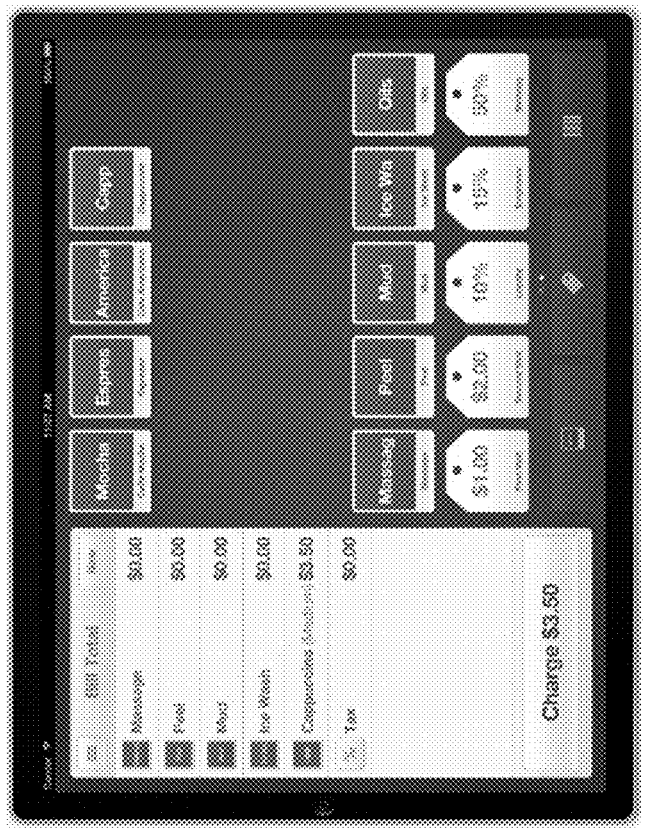
Figure 5D:
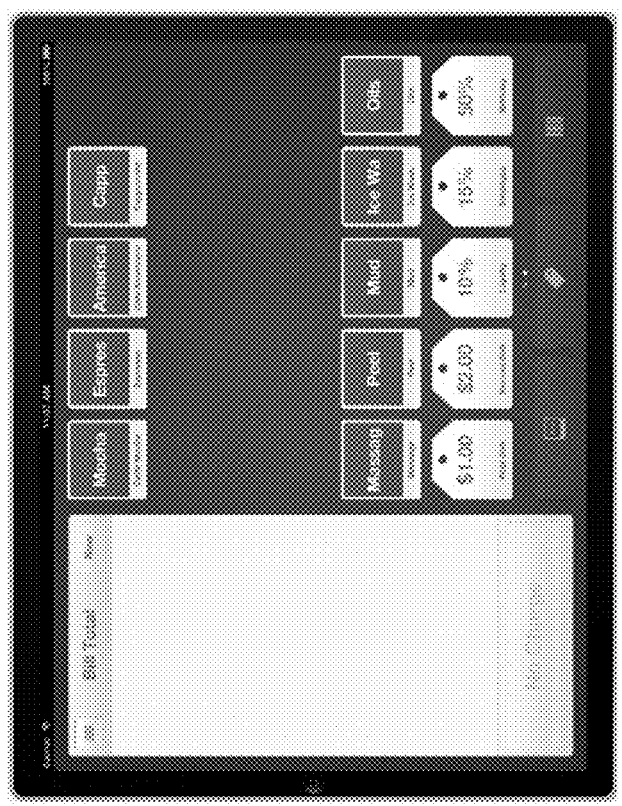

Turning back to FIG. 4, as shown in block 402 of FIG. 4, an apparatus, such as merchant device 105, may be configured for generating a bill. In some embodiments, the bill may comprise at least a total payment owed and at least one indication of each of (1) one or more products provided, (2) one or more experiences provided; and (3) one or more services provided. As shown in block 404 of FIG. 4, an apparatus, such as merchant device 105, may be configured for providing a customer with the bill. For example, display 505 of FIG. 5a shows a display screen that may be configured to display a bill. As shown on display screen 505, a plurality of products, services, and experiences are listed. Here, for example, the employee is provided with indications for adding a plurality of products, services or experiences to the bill, such as massage, peel, mud, ice wash, oils, mocha, espres (shortened from 'espresso'), America (shortened from 'american coffee'), and capp (shortened from 'cappuccino'). The display 505 may additionally provide an itemized list of products, services, or experiences, ordered by or provided to a customer such as for example here, a massage, peel, mud, ice wash and cappuccino. In some embodiments, tax and/or tip may be provided with the payment amount or total bill, as indicated here by 'charge $3.50'.

In some embodiments, the display may provide indications for discounts. Display 505, for example, provides a $1.00 first visit offer, a $2.00 second visit offer, a 10% loyalty offer, a 15% employee offer, and a 50% birthday offer. Other offers may also be accepted and/or applied. In some example embodiments, the apparatus may also be configured to process instruments issued by a promotion and marketing service. As is described above with respect to payment, instruments may be applied to a particular contractor's services or may be spread across each product, service, and experience in a transaction. Additionally, the apparatus may be configured to verify fine print or redemption parameters of an instrument and may apply the instrument based on the issuer, an agreement by the contractor or the like. In some examples, a contractor may have to validate the application of an instrument against his/her products, services, and/or experiences.

As shown in block 406 of FIG. 4, an apparatus, such as merchant device 105, may be configured for receiving a payment or payment information in response to the bill for at least a portion of the total payment. In some embodiments, payment information may be received from a credit card swiper hardwired or wirelessly connected to the merchant device. In some embodiments, a virtual wallet may be employed by the customer for providing payment information. In some embodiments, a customer may pay with cash and the apparatus may be configured to receive input indicating such. As such, FIG. 5b shows display 510, which is configured to display the master merchant name (e.g., "Ulf's Cupcakes"), and payment options, including cash (e.g., "fast cash" amounts $4, $5, $10, and $20) and "other tender" including "cash amount" and "card number." Payment may include a portion of the total payment owed. For example, a cash or credit amount may be less in embodiments, where some discount indication is provided. In some embodiments, additional payment may be received, as in an instance where for example, a tip is provided.

Figure 5C:
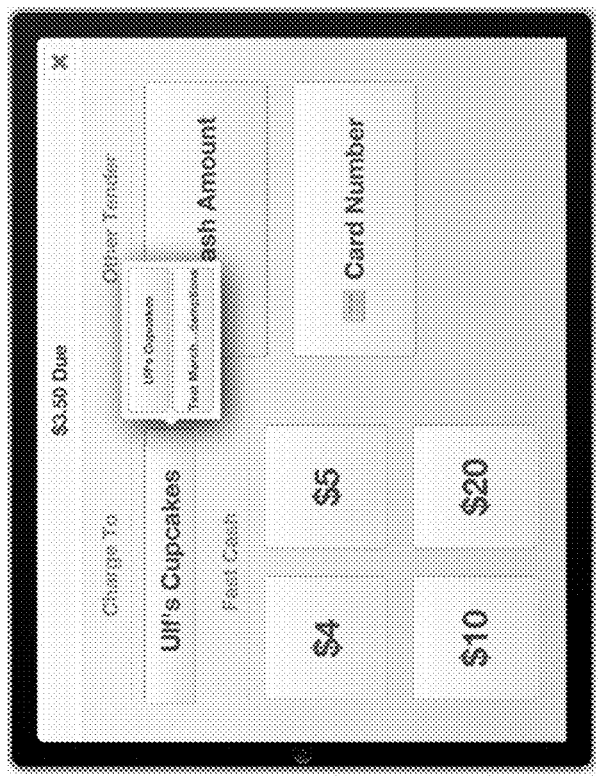

As shown in block 408 of FIG. 4, an apparatus, such as merchant device 105, may be configured for selecting, for one or more of the at least one indication of one or more products provided, one or more experiences provided, or one or more services provided, an approved contractor account from a list of one or more approved contractor accounts linked to the master merchant account. As shown in FIG. 5c, display 515 shows a list of approved contractors. Here for example, the master merchant "Ulf's Cupcakes" is followed by the contractor added in FIGS. 3a-3d, "test merchant." The process for selecting, for one or more of the at least one indication, an approved contractor account from a list of one or more approved contractor accounts may be include providing a list of approved contractor accounts at the time of adding an item to the bill. In some embodiments, the process for selecting may include providing a list of approved contractor accounts after each of one or more products, services, or experiences are added to the bill. In some embodiments, a default contractor account may be associated with one or more products, services, or experiences. As such, when the product, service or experience is added to the bill, no selection is necessary. In some embodiments, a selection process may allow the default contract account to be replaced with a non-default contractor account, when for example, a different contractor provides the product, service or experience.

As shown in block 410 of FIG. 4, an apparatus, such as merchant device 105, may be configured for sending payment and/or payment information, including allocation information to central server for deposit into the appropriate account. In some embodiments, the master merchant account may transfer a portion of the payment to the approved contractor account which was selected in block 408. In some embodiments, the consumer payment is processed by the selected contractor account. In this embodiment, the master merchant does not need to process, receive, or distribute the payment. A shown in FIG. 5d, display 520 may be back to a blank bill screen after the customer has provided payment information and may be ready for a next customer.

Central Server Linking and Allocating Process

Figure 5F:
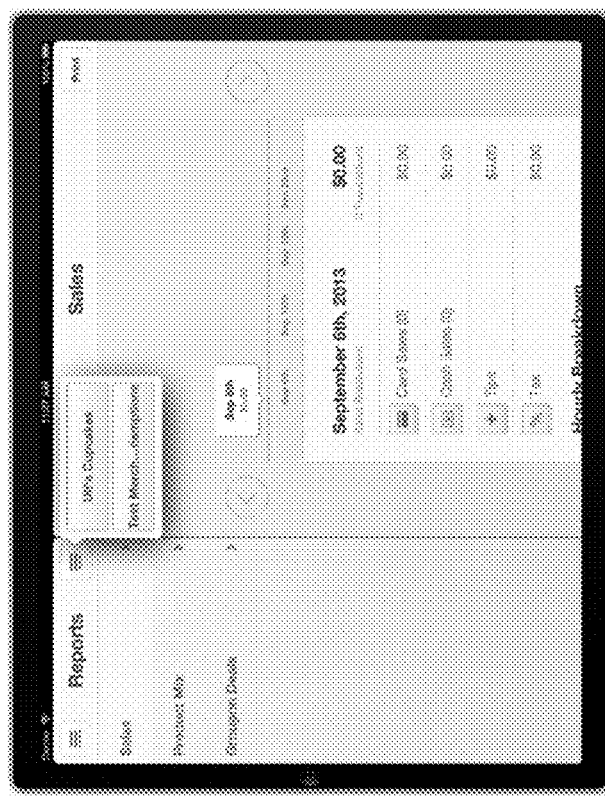
Figure 5E:
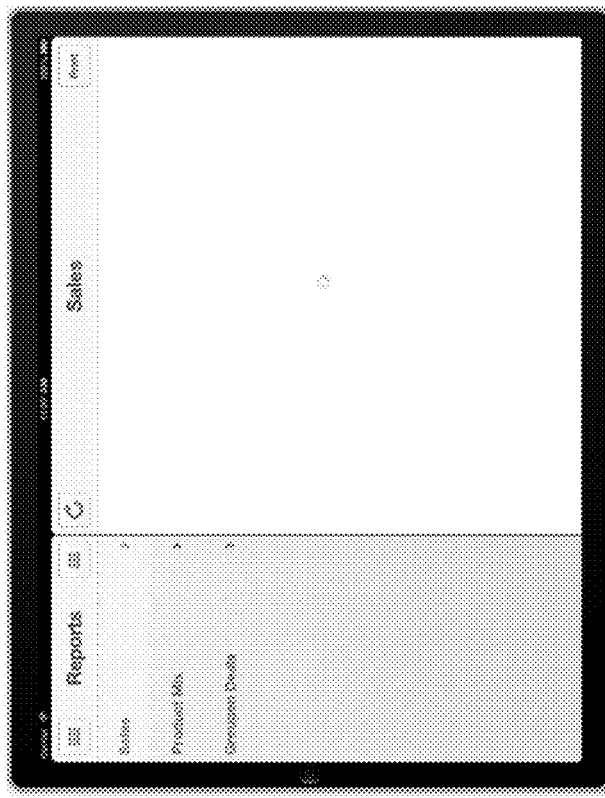

In some embodiments, via communication with the central system, a contractor may be allowed to associate with POS systems at different merchant shops utilizing their contractor account provided by the central system. Furthermore, the central system may be configured to store account data, such as financial data associated payment destinations (e.g., financial accounts) for contractor accounts and/or master merchant accounts. FIGS. 5e and 5f are example embodiments of displays showing account management using the merchant device, in accordance with some embodiments.

For example, FIG. 5e shows display 525, which is configured to provide a "reports" section where a plurality of account management details may be selected. Here, for example, the "reports" section of display 525 shows a "sales" selection, a "product mix" selection, and a "Groupon Deals" section. A user, such as a contractor or an employee of the master merchant, may select one of the account management settings. Here, for example, "sales" is selected. FIG. 5f shows display 530 configured for providing the user with a list of approved contractor accounts and the master merchant account. Once a selection is made, sales data associated with the selected account may be requested and/or received from the central server and displayed on display 530. Here, for example, data may be displayed based on a particular date. As such, display 530 provides a method for selecting a date (e.g., Sep. 6, 2013). As shown, a selection portion of the screen may be provided for allowing the user to select a day in September and arrows may be provided for scrolling to a different month. As one of ordinary skill in the art would appreciate, a number of methods exist for selecting a date and/or time range, each of which may be incorporated into display 530 or the like.

Furthermore, once a date and/or other time period is selected, display 530 may be configured to access, request, and/or receive account data related to the date or time period. Here, for example, display 530 shows data related to "card sales", "cash sales", "tips" and "tax". Display 530 may also be configured to provide an additional breakdown of the time period selected. Here, for example, an hourly breakdown is provided.

Permitting a Master Merchant Account to Transact on Behalf of a Contractor

In some embodiments, in order to grant permission, in the form of provided linking data, to a master merchant account to perform transactions on behalf of a contractor, a series of data flow operation may be performed which allow the contractor at, for example, the master merchant location and using the merchant device to access their contractor account, select the master merchant, and adjust one or more account settings, thus allowing the contractor account to transmit the linking data to the master merchant account. FIG. 6 shows a flow chart of an example data flow represented by method 600, which can result in providing a master merchant account with permission to conduct transactions on behalf of a contractor, performed in accordance with some embodiments.

At 602, connection between the merchant device and the master merchant account is established. At 604, as discussed earlier, the merchant device may transmit a request to add a contractor. A login display is provided to the merchant device. Login data may then be input into the merchant device and send to the contractor account, as shown in 608. At 610, login data may be verified and a secure connection between the contractor account and the merchant device may be established.

If the contractor does not provide login data, the central system or master merchant account may be configured to allow the contractor to create a new account. Alternatively, an option to register a new account may be provided and selected at a login display. Responsive to the selection, the central system may be configured to provide interfaces to the merchant device for creating the new contractor account, after creating the new contractor account, the merchant device may be configured to access the account.

At 612, master merchant accounts with which the contractor account may be link, may be identified and at 614, a list of the one or more master merchant accounts may be transmitted to the merchant device. The merchant device may then, upon displaying the list, may be configured to receive a selection of a master merchant account for which to establish a link to. At 616, the selection may be transmitted to the contractor account. The contractor account then may send link information or the like to the master merchant account selected in 616, as shown in 618.

Sending Payment to Contractor Account

In some embodiments, a series of steps may be performed in order to provide payment to a contractor account in response to products, services, or experiences provided. FIGS. 7A and 7B show a process for allocating an adjusted payment portion to contractor accounts.

FIG. 7A shows a process where a master merchant account may receive payment information and process the transaction. The adjusted payment portions may then be sent to contractor accounts. At 702, connection between the merchant device and the master merchant account is established. At 704, the master merchant account may generate a list of approved contractors based on received link information. In conjunction with providing a customer with one or more products, services, or experiences, the merchant device may generate a bill, at 708. Each of the one or more products, services, or experiences may be associated with a particular contractor. As such, at 710, a list may be provided to the user including one or more approved contractors. The list may also include the master merchant. Once payment is received, payment information may be sent to the master merchant account at 712. At 714, contractor selection information is sent to the master merchant account. At 716, the master merchant account then may associate a payment portion to a contractor account associated with the selected contractor for each of one or more products, services, or experiences. At 718, a payment portion may be adjusted based on tips, offers, redeemed instruments, commission or the like. Once a payment portion is calculated, as shown at 720, an adjusted payment portion may be sent to the contractor account.

FIG. 7B shows a process where payments are received and/or processed by a contractor account directly. Here, a master merchant account does not necessarily insert itself into the payment processing, but simply acts as a conduit for accepting the payment information. Alternatively or additionally, the master merchant account may be used to select the contractor account and all payment processing is solely handled by the contractor account. At 752, connection between the merchant device and the master merchant account is established. At 754, the master merchant account may generate a list of approved contractors based on received link information. In conjunction with providing a customer with one or more products, services, or experiences, the master merchant device may generate a bill, at 758. Each of the one or more products, services, or experiences may be associated with a particular contractor. As such, at 760, a list may be provided to the user including one or more approved contractors. The list may also include the master merchant. At 762, contractor selection information is sent to the master merchant account. Once selection information is received, payment information may be sent directly to the selected contractor account at 764. The contractor account may process the payment from the customer at 766.

Exemplary System Architecture

FIG. 8 shows system 800 including an example network architecture, which may include one or more devices and sub-systems that are configured to implement some embodiments discussed herein. For example, system 800 may include central system 802, which can include, for example, central server 804 and central database 806, among other things (not shown). Central server 804 may be any suitable network server, a plurality of networked servers, and/or other type of processing device. Central database 806 may be any suitable network database configured to store information that may be used to facilitate the techniques as discussed herein. In this regard, system 802 may include, for example, at least one backend data server, network database, cloud computing device, among other things.

Central system 802 may be coupled to one or more merchant devices (e.g., merchant device 810) via network 808. In this regard, network 808 may include any wired or wireless communication network including, for example, a wired or wireless local area network (LAN), personal area network (PAN), metropolitan area network (MAN), wide area network (WAN), mobile broadband network, or the like, as well as any hardware, software and/or firmware required to implement it (such as, e.g., network routers, etc.). For example, network 808 may include a cellular telephone, an 802.11, 802.16, 802.20, and/or WiMax network. Further, the network 808 may include a public network, such as the Internet, a private network, such as an intranet, or combinations thereof, and may utilize a variety of networking protocols now available or later developed including, but not limited to TCP/IP based networking protocols.

As discussed above, merchant device 810 may be associated with a master merchant, such as a retail store, restaurant, etc. or one or more employees of the master merchant. In some embodiments, merchant device 810 may be a POS device that is configured to receive payments at the master merchant's shop. As such, merchant device 810 may include a personal computer and/or other networked device, such as a cellular phone, tablet computer, mobile device, etc., that may be used for any suitable purpose in addition to providing POS functionality at the restaurant.

System 800 may further include one or more consumer devices (e.g., consumer device 812). Consumer device 812 may connect with merchant device 810 via network 808. In some embodiments, central system 800 may further include one or more third party systems (e.g., third party system 814), among other things. In some embodiments, different third party systems may be associated with different types of payment sources or payment destinations. Thus for each payment source or destination, data may be sent to an appropriate third party system (e.g., a credit card transaction server, a bank account, etc.) to validate and/or process payments. Furthermore, as discussed above, employee payment accounts and/or consumer payment accounts may be associated with one or more third party accounts that are provided by third party system 814.

In some embodiments, central system 802 may be a multi-tenant database system configured to provide services to a plurality of consumers and master merchants. Additionally and/or alternatively, central system 802 may be configured to include, or work in connection with, online ordering systems (e.g., shop online and pickup), promotional systems (e.g., instruments, promotions, instruments, offerings, purchases, and redemptions, where the value of a redeemed instrument may be deducted from the payment), merchant systems (e.g., kitchen systems for restaurants), and/or appointment systems (e.g., scheduling a reservation at a restaurant). As such, the techniques disclosed herein may be applicable to any environment that involves consumer and employee interactions.

FIG. 9 shows a schematic block diagram of circuitry 900, some or all of which may be included in, for example, central system 904, consumer device 912, and/or merchant device 910. In accordance with some example embodiments, circuitry 900 may include various means, such as one or more processors 902, memories 904, communications modules 9706, and/or input/output modules 908.

In some embodiments, such as when circuitry 900 is included in merchant device 910 and/or central system 902, payment/redemption module 910 may also or instead be included. As referred to herein, "module" includes hardware, software and/or firmware configured to perform one or more particular functions. In this regard, the means of circuitry 900 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 904) that is executable by a suitably configured processing device (e.g., processor 902), or some combination thereof.

Processor 902 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 9 as a single processor, in some embodiments, processor 902 comprises a plurality of processors. The plurality of processors may be embodied on a single computing device or may be distributed across a plurality of computing devices collectively configured to function as circuitry 900. The plurality of processors may be in operative communication with each other and may be collectively configured to perform one or more functionalities of circuitry 900 as described herein. In an example embodiment, processor 902 is configured to execute instructions stored in memory 904 or otherwise accessible to processor 902. These instructions, when executed by processor 902, may cause circuitry 900 to perform one or more of the functionalities of circuitry 900 as described herein.

Whether configured by hardware, firmware/software methods, or by a combination thereof, processor 902 may comprise an entity capable of performing operations according to embodiments of the present invention while configured accordingly. Thus, for example, when processor 902 is embodied as an ASIC, FPGA or the like, processor 902 may comprise specifically configured hardware for conducting one or more operations described herein. As another example, when processor 902 is embodied as an executor of instructions, such as may be stored in memory 904, the instructions may specifically configure processor 902 to perform one or more algorithms and operations described herein.

Memory 904 may comprise, for example, volatile memory, non-volatile memory, or some combination thereof. Although illustrated in FIG. 9 as a single memory, memory 904 may comprise a plurality of memory components. The plurality of memory components may be embodied on a single computing device or distributed across a plurality of computing devices. In various embodiments, memory 904 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 904 may be configured to store information, data, applications, instructions, or the like for enabling circuitry 900 to carry out various functions in accordance with example embodiments discussed herein. For example, in at least some embodiments, memory 904 is configured to buffer input data for processing by processor 902. Additionally or alternatively, in at least some embodiments, memory 904 may be configured to store program instructions for execution by processor 902. Memory 904 may store information in the form of static and/or dynamic information. This stored information may be stored and/or used by circuitry 900 during the course of performing its functionalities.

Communications module 906 may be embodied as any device or means embodied in circuitry, hardware, a computer program product comprising computer readable program instructions stored on a computer readable medium (e.g., memory 904) and executed by a processing device (e.g., processor 902), or a combination thereof that is configured to receive and/or transmit data from/to another device, such as, for example, a second circuitry 900 and/or the like. In some embodiments, communications module 906 (like other components discussed herein) can be at least partially embodied as or otherwise controlled by processor 902. In this regard, communications module 906 may be in communication with processor 902, such as via a bus. Communications module 906 may include, for example, an antenna, a transmitter, a receiver, a transceiver, network interface card and/or supporting hardware and/or firmware/software for enabling communications with another computing device. Communications module 906 may be configured to receive and/or transmit any data that may be stored by memory 904 using any protocol that may be used for communications between computing devices. Communications module 906 may additionally or alternatively be in communication with the memory 904, input/output module 908 and/or any other component of circuitry 900, such as via a bus.

Input/output module 908 may be in communication with processor 902 to receive an indication of a user input and/or to provide an audible, visual, mechanical, or other output to a user. Some example visual outputs that may be provided to a user by circuitry 900 are discussed in connection with the displays described above. As such, input/output module 908 may include support, for example, for a keyboard, a mouse, a joystick, a display, an image capturing device, a touch screen display, a microphone, a speaker, a RFID reader, barcode reader, biometric scanner, and/or other input/output mechanisms. In embodiments wherein circuitry 900 is embodied as a server or database, aspects of input/output module 908 may be reduced as compared to embodiments where circuitry 900 is implemented as an end-user machine (e.g., consumer device and/or merchant device) or other type of device designed for complex user interactions. In some embodiments (like other components discussed herein), input/output module 908 may even be eliminated from circuitry 900. Alternatively, such as in embodiments wherein circuitry 900 is embodied as a server or database, at least some aspects of input/output module 908 may be embodied on an apparatus used by a user that is in communication with circuitry 900, such as for example, merchant device 910 and/or consumer device 912. Input/output module 908 may be in communication with memory 904, communications module 906, and/or any other component (s), such as via a bus. Although more than one input/output module and/or other component can be included in circuitry 900, only one is shown in FIG. 9 to avoid overcomplicating the drawing (like the other components discussed herein).

Payment/redemption module 910 may also or instead be included and configured to perform the functionality discussed herein related to facilitating payment transactions discussed above. In some embodiments, some or all of the functionality facilitating payment transactions may be performed by processor 902. In this regard, the example processes and algorithms discussed herein can be performed by at least one processor 902 and/or payment/redemption module 910. For example, non-transitory computer readable storage media can be configured to store firmware, one or more application programs, and/or other software, which include instructions and other computer-readable program code portions that can be executed to control processors of the components of system 900 to implement various operations, including the examples shown above. As such, a series of computer-readable program code portions may be embodied in one or more computer program products and can be used, with a computing device, server, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein.

It is also noted that all or some of the information presented by the example displays discussed herein can be based on data that is received, generated and/or maintained by one or more components of system 2600. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. Each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 902 and/or payment/redemption module 910 discussed above with reference to FIG. 9, to produce a machine, such that the computer program product includes the instructions which execute on the computer or other programmable data processing apparatus create a means for implementing the functions specified in the flowchart block or blocks.

These computer program instructions may also be stored in a computer-readable storage medium (e.g., memory 904) that can direct a computer or other programmable data processing apparatus to function in a particular manner, such that the instructions stored in the computer-readable storage medium produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, the block diagrams and flowchart illustrations support combinations of means for performing the specified functions, combinations of steps for performing the specified functions and program instruction means for performing the specified functions. It will also be understood that each block/step of the circuit diagrams and process flowcharts, and combinations of blocks/steps in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. For example, although the examples discussed herein do not require the consumer to present a form of payment (such as a credit card) to the merchant, some embodiments of the merchant device can be configured to work with one or more peripheral devices that can receive payment information directly from a consumer (such as a credit card reader, radio frequency identification reader, etc.) in addition to or instead of from the central system. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A point of sale (POS) for enabling transaction processing by a master merchant account that enables funds to pass to one or more linked approved contractor accounts, the POS device comprising:
   a processor including one or more processing devices configured to perform independently or in tandem to execute hard-coded functions or execute software instructions;
   a user interface;
   a communications module; and
   a memory comprising one or more volatile or non-volatile electronic storage devices storing computer-readable instructions configured, when executed, to cause the processor to:
   generate one or more linked approved contractor accounts by linking one or more contractor accounts to the master merchant account,
   wherein each of the one or more linked approved contractor accounts is an approved contractor account linked to the master merchant account through an authorization and authentication process;
   perform an authorization and authentication process, the authorization and authentication process comprising computer-readable instructions configured, when executed, to cause the processor to:
      receive, from user input, at the POS device, a request to add a new contractor account to the master merchant account;
      transmit, to a server, via the communications module, financial account data associated with the new contractor account and login data, including a username and a password associated with the new contractor account; and
      transmit, to the server, via the communications module, information identifying the master merchant account to which to add the new contractor account;
      receive, from the server, confirmation of an authorization to link the new contractor account to the master merchant account; and
      display, on the POS device, via the user interface, upon confirmation of the authorization to link the new contractor account to the master merchant account, information indicative of the new contractor account as part of a list of one or more approved contractor accounts linked to the master merchant account;
   generate, at the POS device, a bill, the bill comprising at least a charge amount and at least one indication for each of (1) one or more products provided, (2) one or more experiences provided; and (3) one or more services provided, wherein each of the one or more products provided, one or more experiences provided and one or more services provided is associated with a cost;

calculate a charge amount by adding at least the cost associated with each of the one or more products provided, the one or more experiences provided, and the one or more services provided, wherein the cost includes at least a first cost, the first cost associated with a portion of a cost of a first product, experience, or service, the portion of the cost of the first product, experience, or service associated with a sub-component product, experience, or service of the first product, experience, or service wherein the portion of the cost of the first product, experience, or service is associated with a first contractor account from the list of one or more approved contractor accounts linked to the master merchant account and further comprises at least a second cost, the second costs associated with at least one of (1) a second portion of the cost of the first product, experience, or service, the second portion of the cost of the first product, experience, or service associated with a second sub-component product, experience, or service of the first product, wherein the second sub-component product, experience, or service is unique from the first sub-component product, experience, or service, further wherein the second portion of the cost of the first product, experience, or service is associated with a second contractor account from the list of one or more approved contractor accounts linked to the master merchant account or (2) a portion of a second product, experience, or service that is associated with the second contractor account from the list of one or more approved contractor accounts linked to the master merchant account; and calculate the charge amount by subtracting an amount associated with one or more redeemed instruments;

display, on the POS device, via the user interface, at least the first contractor account and the second contractor account as part of the list of one or more approved contractor accounts linked to the master merchant account;

receive, via the user interface, selection of a first linked approved contractor account from the list of one or more approved contractor accounts linked to the master merchant account indicated to be associated with the one or more products provided, the one or more experiences provided, or the one or more services provided having the first cost and a second linked approved contractor account from the list of one or more approved contractor accounts linked to the master merchant account indicated to be associated with the one or more products provided, the one or more experiences provided, or the one or more services provided having the second cost;

receive a redeemable instrument having a value that is applied to the charge amount;

receive, via the user interface or the communications module, a single payment or one instance of payment information for the charge amount to the master merchant account;

receive a tip amount having a value that is added to the charge amount; and cause transfer, via the communication module, of a first portion of the value of the single payment or the one instance of payment information to first linked approved contractor account selected from the list of one or more approved contractor accounts linked to the master merchant account from the master merchant account; and cause transfer, via the communication module, of a second portion of the amount of the single payment or the one instance of payment information to the second linked approved contractor account selected from the list of one or more approved contractor accounts linked to the master merchant account from the master merchant account, wherein the first portion of the value of the single payment or the one instance of payment information that is transferred is a function of the first cost, a first portion of the redeemed instrument, and a first portion of the tip amount, and the second portion of the value of the single payment or the one instance of payment information that is transferred is a function of the second cost, a second portion of the redeemed instrument, and a second portion of the tip amount.

2. The POS device of claim 1, wherein the first cost, a first portion of the redeemed instrument, and a first portion of the tip amount transferred to the first linked approved contractor account calculated by:

(1) factoring the first cost; (2) subtracting a commission amount; and (3) subtracting an amount associated with first portion of the redeemed instrument; and cause transfer, via the communication module, of the second cost, a second portion of the redeemed instrument, and a second portion of the tip amount to the second linked approved contractor account, the portion of the charge amount and the portion of the tip amount transferred to the second contractor account calculated by:

(1) factoring the second cost; (2) subtracting a commission amount; and (3) subtracting an amount associated with the second portion of the redeemed instrument.

3. The POS device of claim 1, wherein the memory further stores computer-readable instructions that, when executed, cause the processor to:

calculate the charge amount by adding the cost associated with each of the one or more products provided, the one or more experiences provided, and the one or more services provided.

4. The POS device of claim 3, wherein the memory further stores computer-readable instructions that, when executed, cause the processor to:

calculate the charge amount by subtracting an amount associated with one or more redeemed instruments.

5. The POS device of claim 1, wherein the memory further stores computer-readable instructions that, when executed, cause the processor to:

calculate the portion of the charge amount based on the cost associated the one or more products provided, the one or more experiences provided and the one or more services provided.

6. The POS device of claim 5, wherein the memory further stores computer-readable instructions that, when executed, cause the processor to:

calculate the portion of the charge amount by subtracting a commission amount.

7. A method comprising:

generating one or more linked approved contractor accounts by linking one or more contractor accounts to a master merchant account, wherein each of the one or more linked approved contractor accounts is an approved contractor account linked to the master merchant account through an authorization and authentication process;

performing an authorization and authentication process, the authorization and authentication process comprising:

receiving, from user input, via a user interface, at a POS device a request to add a new contractor account to the master merchant account;

transmitting, to a server, via the communications module, financial account data associated with the new contractor account and login data, including a username and a password associated with the new contractor account; and transmitting, to the server via the communications module, information identifying the master merchant account to which to add the new contractor account;

receiving, from the server, confirmation of an authorization to link the new contractor account to the master merchant account; and displaying, on the POS device, via the user interface, upon confirmation of the authorization to link the new contractor account to the master merchant account, information indicative of the new contractor account as part of a list of one or more approved contractor accounts linked to the master merchant account;

generating, at the POS device, via a processor, a bill, the bill comprising at least a charge amount and at least one indication for each of (1) one or more products provided, (2) one or more experiences provided; and (3) one or more services provided, wherein each of the one or more products provided, one or more experiences provided and one or more services provided is associated with a cost;

calculating a charge amount by adding at least the cost associated with each of the one or more products provided, the one or more experiences provided, and the one or more services provided, wherein the cost includes at least a first cost, the first cost associated with a portion of a cost of a first product, experience, or service, the portion of the cost of the first product, experience, or service associated with a sub-component product, experience, or service of the first product, experience, or service, wherein the portion of the cost of the first product, experience, or service is associated with a first contractor account from the list of one or more approved contractor accounts linked to the master merchant account and further comprises at least a second cost, the second costs associated with at least one of (1) a second portion of the cost of the first product, experience, or service, the second portion of the cost of the first product, experience, or service associated with a second sub-component product, experience, or service of the first product, wherein the second sub-component product, experience, or service is unique from the first sub-component product, experience, or service, further wherein the second portion of the cost of the first product, experience, or service is associated with a second contractor account from the list of one or more approved contractor accounts linked to the master merchant account or (2) a portion of a second product, experience, or service that is associated with a second contractor account from the list of one or more approved contractor accounts linked to the master merchant account; and calculating the charge amount by subtracting an amount associated with one or more redeemed instruments;

displaying, on the POS device, via the user interface, at least the first contractor account and the second contractor account as part of the list of one or more approved contractor accounts linked to the master merchant account;

receiving, via a user interface, selection of a first linked approved contractor account from the list of one or more approved contractor accounts linked to the master merchant account indicated to be associated with the one or more products provided, the one or more experiences provided, or the one or more services provided having the first cost and a second linked approved contractor account from the list of one or more approved contractor accounts linked to the master merchant account indicated to be associated with the one or more products provided, the one or more experiences provided, or the one or more services provided having the second cost;

receiving a redeemable instrument having a value that is applied to the charge amount;

receiving, via the user interface or a communications module, a single payment or one instance of payment information for the charge amount to the master merchant account;

receiving a tip amount having a value that is added to the charge amount; and causing transfer, via the communication module, of a first portion of the value of the single payment or the one instance of payment information to first linked approved contractor account selected from the list of one or more approved contractor accounts linked to the master merchant account from the master merchant account; and causing transfer, via the communication module, of a second portion of the amount of the single payment or the one instance of payment information to the second linked approved contractor account selected from the list of one or more approved contractor accounts linked to the master merchant account from the master merchant account, wherein the first portion of the value of the single payment or the one instance of payment information that is transferred is a function of the first cost, a first portion of the redeemed instrument, and a first portion of the tip amount, and the second portion of the value of the single payment or the one instance of payment information that is transferred is a function of the second cost, a second portion of the redeemed instrument, and a second portion of the tip amount.

8. The method of claim 7, the first cost, a first portion of the redeemed instrument, and a first portion of the tip amount transferred to the first linked approved contractor account calculated by:

(1) factoring the first cost; (2) subtracting a commission amount; and (3) subtracting an amount associated with first portion of the redeemed instrument; and cause transfer, via the communication module, of the second cost, a second portion of the redeemed instrument, and a second portion of the tip amount to the second linked approved contractor account, the portion of the charge amount and the portion of the tip amount transferred to the second contractor account calculated by:

(1) factoring the second cost; (2) subtracting a commission amount; and (3) subtracting an amount associated with the second portion of the redeemed instrument.

9. The method of claim 7, further comprising:
calculating the charge amount by adding the cost associated with each of the one or more products provided, the one or more experiences provided, and the one or more services provided.

10. The method of claim 9, further comprising:
calculating the charge amount by subtracting an amount associated with one or more redeemed instruments.

11. The method of claim 7, further comprising:
calculating the portion of the charge amount based on the cost associated the one or more products provided, the one or more experiences provided and the one or more services provided.

12. The method of claim 11, further comprising:
calculating the portion of the charge amount by subtracting a commission amount.

13. A computer program product comprising at least one non-transitory computer-readable storage medium having computer-executable program code instructions stored therein, the computer-executable program code instructions comprising program code instructions for:
generating one or more linked approved contractor accounts by linking one or more contractor accounts to a master merchant account,
wherein each of the one or more linked approved contractor accounts is an approved contractor account linked to the master merchant account through an authorization and authentication process;
performing an authorization and authentication process, the authorization and authentication process comprising:
receiving, from user input, via a user interface, at a POS device, a request to add a new contractor account to the master merchant account;
transmitting, to a server, via the communications module, financial account data associated with the new contractor account and login data,
including a username and a password associated with the new contractor account; and
transmitting, to the server via the communications module, information identifying the master merchant account to which to add the new contractor account;
receiving, from the server, confirmation of an authorization to link the new contractor account to the master merchant account; and
displaying, on the POS device, via the user interface, upon confirmation of the authorization to link the new contractor account to the master merchant account, information indicative of the new contractor account as part of a list of one or more approved contractor accounts linked to the master merchant account;
generating, at the POS device, via a processor, a bill, the bill comprising at least a charge amount and at least one indication for each of (1) one or more products provided, (2) one or more experiences provided; and (3) one or more services provided,
wherein each of the one or more products provided, one or more experiences provided and one or more services provided is associated with a cost;
calculating a charge amount by adding at least the cost associated with each of the one or more products provided, the one or more experiences provided, and the one or more services provided,
wherein the cost includes at least a first cost, the first cost associated with a portion of a cost of a first product, experience, or service, the portion of the cost of the first product, experience, or service associated with a sub-component product, experience, or service of the first product, experience, or service, wherein the portion of the cost of the first product, experience, or service is associated with a first contractor account from the list of one or more approved contractor accounts linked to the master merchant account and further comprises at least a second cost, the second costs associated with at least one of (1) a second portion of the cost of the first product, experience, or service, the second portion of the cost of the first product, experience, or service associated with a second sub-component product, experience, or service of the first product, wherein the second sub-component product, experience, or service is unique from the first sub-component product, experience, or service, further wherein the second portion of the cost of the first product, experience, or service is associated with a second contractor account from the list of one or more approved contractor accounts linked to the master merchant account or (2) a portion of a second product, experience, or service that is associated with a second contractor account from the list of one or more approved contractor accounts linked to the master merchant account; and
calculating the charge amount by subtracting an amount associated with one or more redeemed instruments;
displaying, on the POS device, via the user interface, at least the first contractor account and the second contractor account as part of the list of one or more approved contractor accounts linked to the master merchant account;
receiving, via a user interface, selection of a first linked approved contractor account from the list of one or more approved contractor accounts linked to the master merchant account indicated to be associated with the one or more products provided, the one or more experiences provided, or the one or more services provided having the first cost and a second linked approved contractor account from the list of one or more approved contractor accounts linked to the master merchant account indicated to be associated with the one or more products provided, the one or more experiences provided, or the one or more services provided having the second cost;
receiving a redeemable instrument having a value that is applied to the charge amount;
receiving, via the user interface or a communications module, a single payment or one instance of payment information for the charge amount to the master merchant account;
receiving a tip amount having a value that is added to the charge amount; and
causing transfer, via the communication module, of a first portion of the value of the single payment or the one instance of payment information to first linked approved contractor account selected from the list of one or more approved contractor accounts linked to the master merchant account from the master merchant account; and
causing transfer, via the communication module, of a second portion of the amount of the single payment or the one instance of payment information to the second linked approved contractor account selected from the list of one or more approved contractor accounts linked to the master merchant account from the master merchant account,
wherein the first portion of the value of the single payment or the one instance of payment information that is transferred is a function of the first cost, a first portion of the redeemed instrument, and a first portion of the tip amount, and the second portion of the value of the single payment or the one instance of payment information that is transferred is a function of the second cost, a second portion of the redeemed instrument, and a second portion of the tip amount.

14. The computer program product according to claim 13, wherein the computer-executable program code instructions further comprise program code instructions for:
  the first cost, a first portion of the redeemed instrument, and a first portion of the tip amount transferred to the first linked approved contractor account calculated by:
  (1) factoring the first cost; (2) subtracting a commission amount; and (3) subtracting an amount associated with first portion of the redeemed instrument; and
  cause transfer, via the communication module, of the second cost, a second portion of the redeemed instrument, and a second portion of the tip amount to the second linked approved contractor account,
  the portion of the charge amount and the portion of the tip amount transferred to the second contractor account calculated by:
  (1) factoring the second cost; (2) subtracting a commission amount; and (3) subtracting an amount associated with the second portion of the redeemed instrument.

15. The computer program product according to claim 13, wherein the computer-executable program code instructions further comprise program code instructions for:
  calculating the charge amount by adding the cost associated with each of the one or more products provided, the one or more experiences provided, and the one or more services provided.

16. The computer program product according to claim 15, wherein the computer-executable program code instructions further comprise program code instructions for:
  calculating the charge amount by subtracting an amount associated with one or more redeemed instruments.

17. The computer program product according to claim 13, wherein the computer-executable program code instructions further comprise program code instructions for:
  calculating the portion of the charge amount based on the cost associated the one or more products provided, the one or more experiences provided and the one or more services provided.

18. The computer program product according to claim 17, wherein the computer-executable program code instructions further comprise program code instructions for:
  calculating the portion of the charge amount by subtracting a commission amount.

* * * * *